Patented Nov. 24, 1931

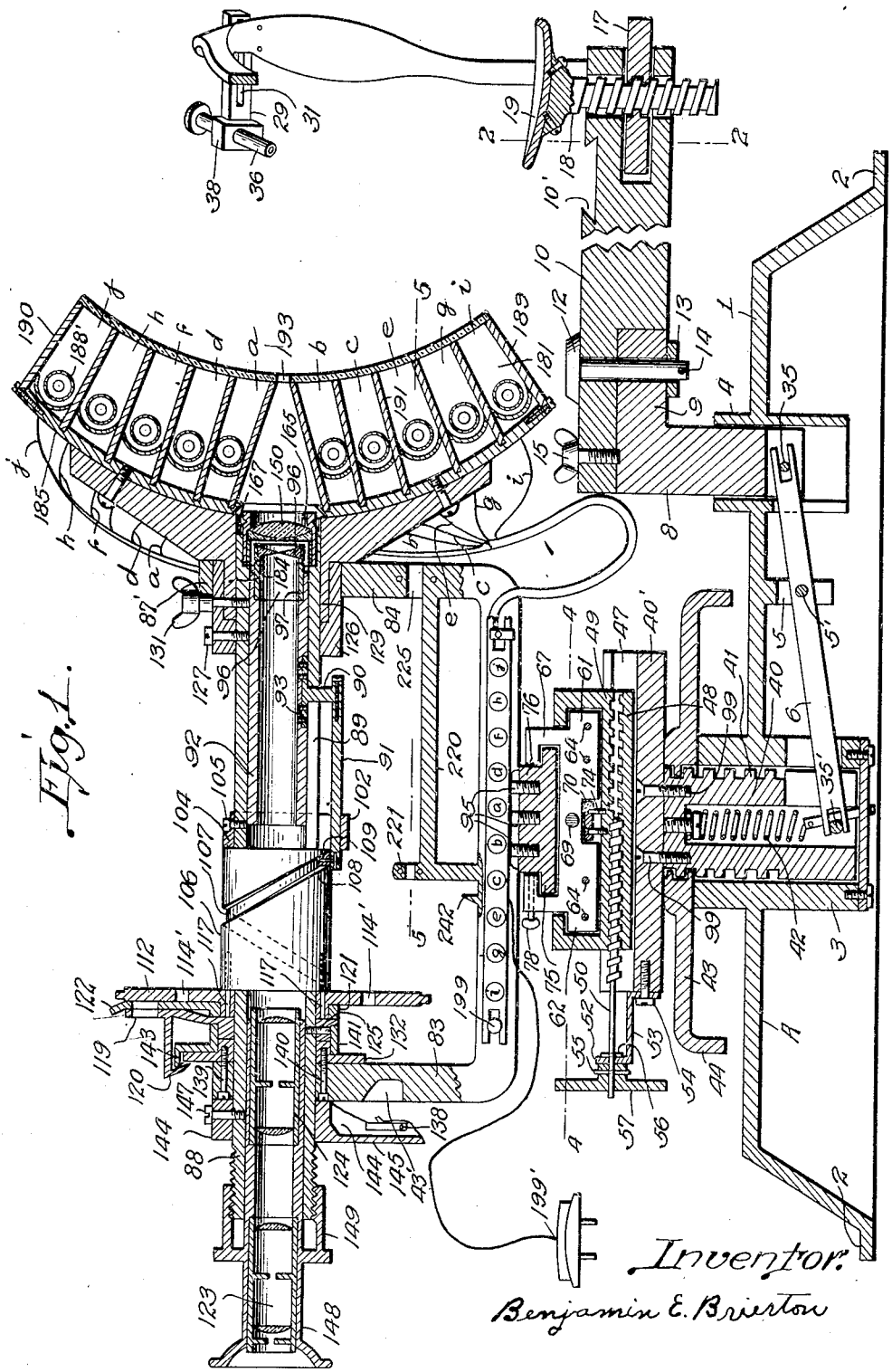

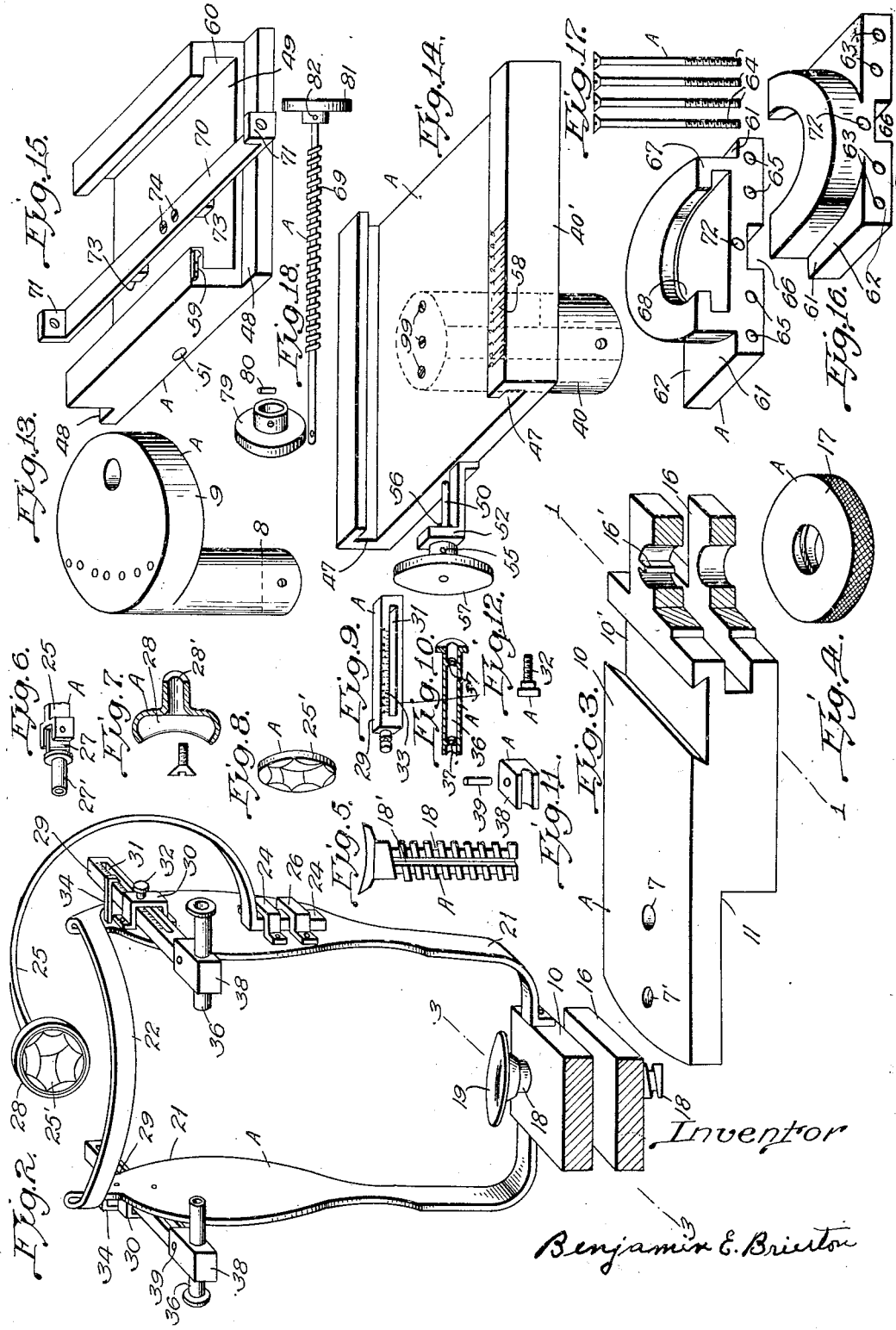

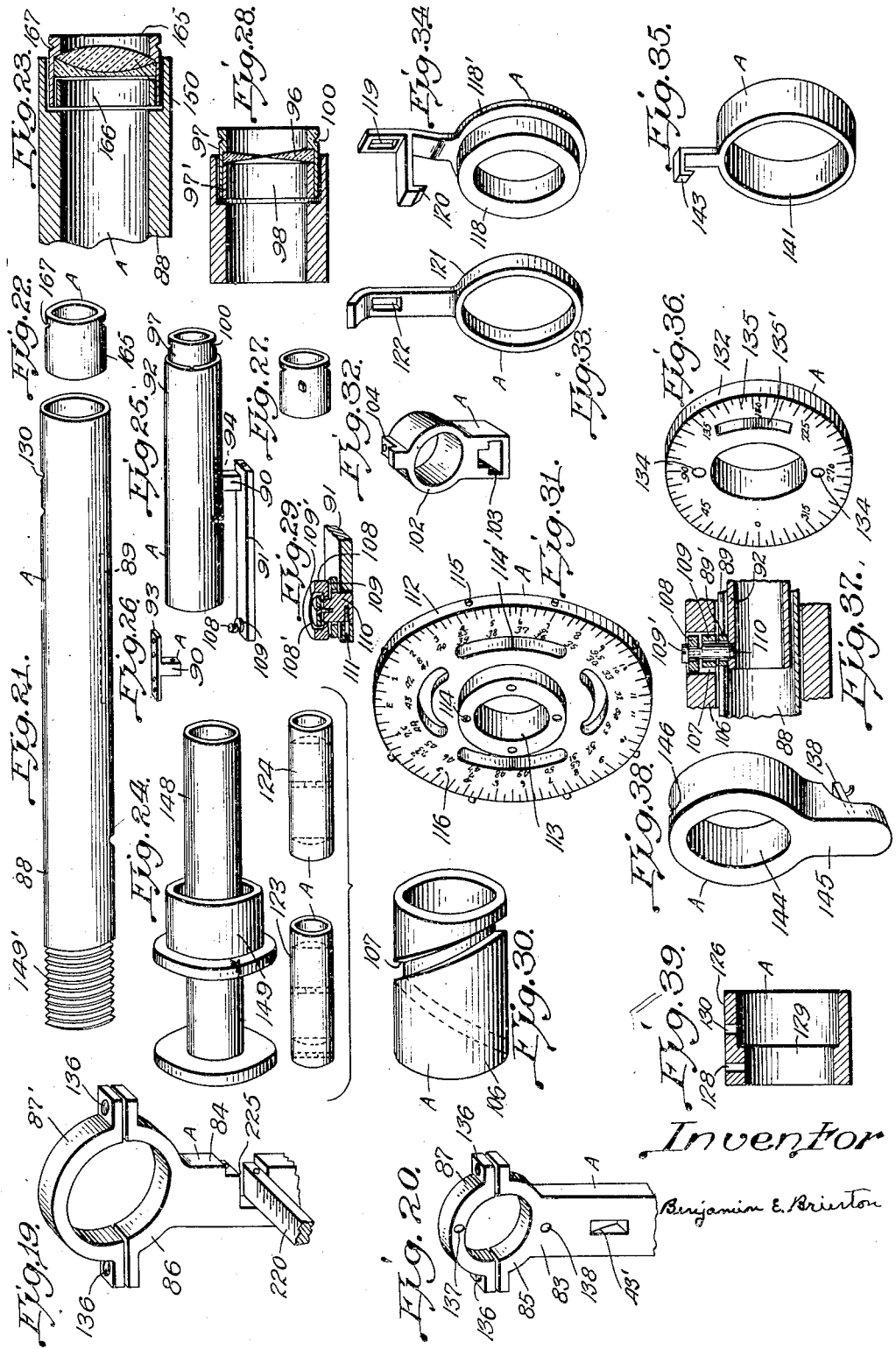

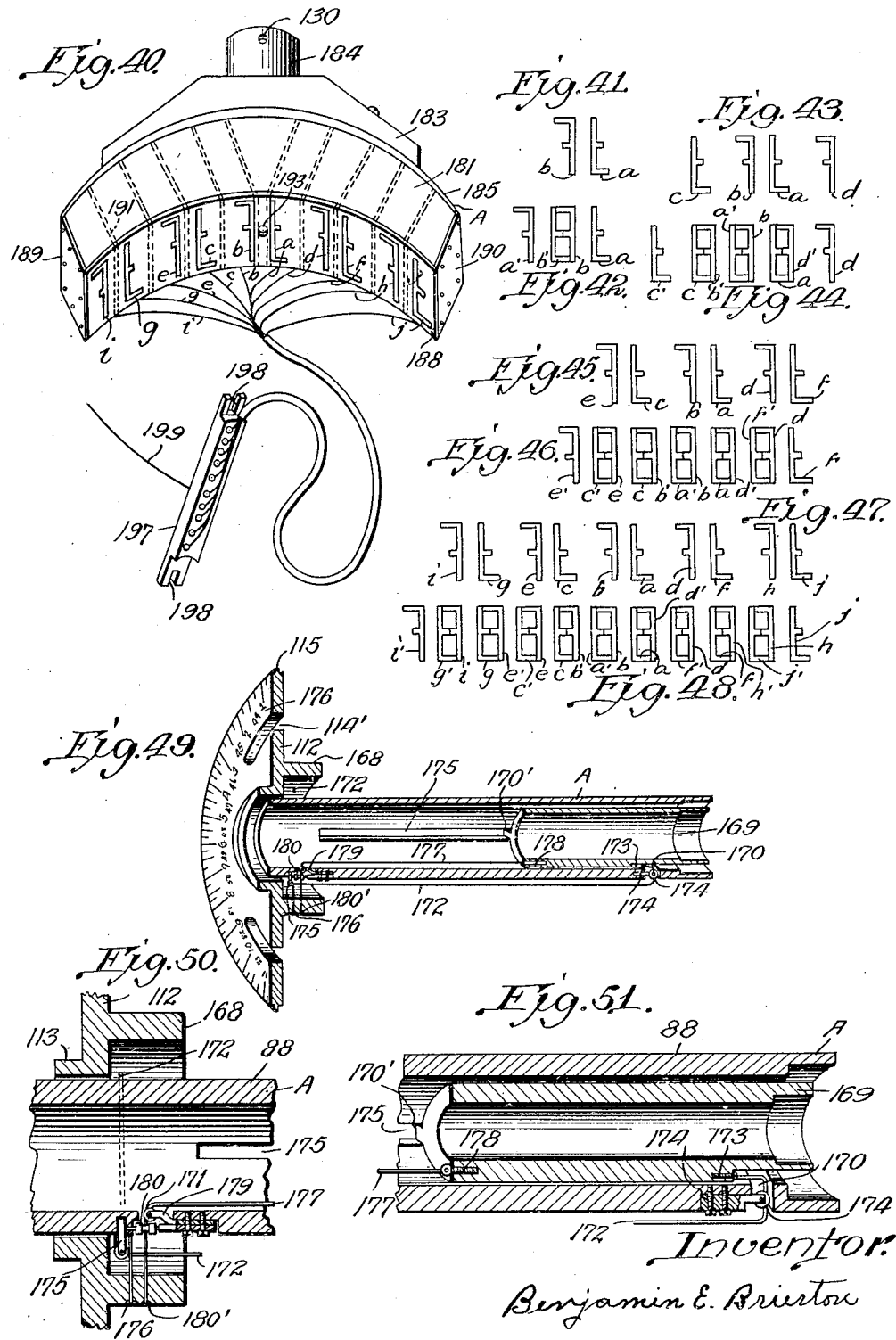

1,833,482

UNITED STATES PATENT OFFICE

BENJAMIN E. BRIERTON, OF BIRMINGHAM, ALABAMA

OPHTHALMOLOGICAL METHOD AND APPARATUS

Application filed January 2, 1925, Serial No. 267. Renewed February 25, 1931.

The present invention relates to the art of examining and measuring the anterior portions of human eyes. The examination, for detecting pathological conditions and for diagnostic purposes; the said examination made by careful observation of the membranes and tunics of the eye, while under illumination and under magnification, and the said measurement made by reflecting images on the exterior surfaces of the eye under measurement, doubling said images to the observing eye and approximating an extraordinary image to an ordinary image to consumate mensuration of curvature, and thus the refractive value, of the cornea of the eye, and in like manner by reflecting images on the exterior surfaces of measuring the curvature of the anterior portion of the sclerotic tunic of the eye for the purpose of estimating the antero-posterior axial length of the eye.

In like manner to a convex mirror, the cornea of the human eye reflects a small image of any object placed before it. The size of the image is governed by three things: They are, the radii of curvature of the cornea, the size of the object and, the distance of said object from the cornea. Because, in this art, I employ objects for reflecting images on respective corneas cooperatively with their corneal-images, and said objects and their corneal-images cooperatively with graduated scales, for measuring curvature of said respective corneas, and by means of said measurement of the radius of curvature of the respective cornea ascertain its refractive value in diopters, the said objects must be of a known size, the respective corneas, for obtaining accurate measurement, must be located each successively at the same distance from said objects, must be kept at that distance throughout the measurement, and the spacings of the graduations of the scales, to cooperate with said objects and their images on respective corneas that will have different length radiuses of curvature, must be more widely spaced as respects those provided for registering one diopter of refractive value of corneas having relatively long radiuses of curvature than for corneas having relatively short radiuses of curvature; that is, the spacings of diopter-graduations on the scale must conform with the ratio of change per diopter of refractive value from a cornea having a long radius and weak curvature towards corneas having shorter radiuses of curvature or stronger curvature.

In the present art the reflected images are employed relatively to their width on a respective meridian of a cornea, therefore, the size of an image shall mean its width. And to illustrate, if I employ an object 25 mm. in diameter and locate before it, successively, six different corneas ranging in radii of curvature from 5.8 mm. to 10.8 mm. and locate each cornea 200 mm. from said object I may formulate the following table. In said table, C. means cornea; RC. means radius of curvature; PF. means principal focus of the cornea; I. means the image; and D. means the dioptric value of respective corneas, accepting 1.3333 as the index of refraction of the cornea.

C.RC.5.8 mm.PF.2.90 mm.I. 0.362,500 mm. D.57.4655
C.RC.6.8 mm.PF.3.40 mm.I. 0.425,000 mm. D.49,0147
C.RC.7.8 mm.PF.3.90 mm.I. 0.487,500 mm. D.42.7307
C.RC.8.8 mm.PF.4.40 mm.I. 0.550,000 mm. D.37.8750
C.RC.9.8 mm.PF.4.90 mm.I. 0.612,500 mm. D.34.0102
C.RC.10.8 mm.PF.5.40 mm.I. 0.675,000 mm. D.30,8611

Observation of the table above discloses that each respective cornea named therein reflects an image measuring 0.062,500 mm. larger or smaller than the image on the corneas named to each side of it. That is, from the first cornea named in the table the increase in size of image from cornea to cornea is 0.062,500 mm. However, a like gradual increase or decrease in dioptric value of the named corneas is not found. Taking, as an example, the cornea given in said table as having a radius of curvature of 7.8 mm. as the standard cornea I find that between it and the 5.8 mm. radius cornea there is 2.0 mm. difference in the radii of curvature and a difference of 14.7348 diopters, while between said 7.8 mm. radius cornea and the 10.8 mm. radius cornea there is a difference of 3.0 mm. radius difference in dioptric value of only 11.8696 diopters.

In instruments of the class described, if the distance between the object (or objects) used for reflecting images: for example may I say, 25 mm. object (or any known size object), and respective corneas is always a specified distance of 200 mm. (or any other specified distance), mensuration through employment of images of said objects will be correct, however, from a like calculation to that used for establishing the above table, it would be found that if a cornea having 5.8 mm. radius, and thus 57.46 D. value, should be moved away from the object reflecting the image used one millimeter (1 mm.) the size of the image would be decreased to the size of an image of the same object reflected on a 57.74 D. cornea. And thus it is obvious that if the scales of the instrument were established on said specified distance of separation of the cornea under measurement and the object used for reflecting the mensural-image, and then during the process of measuring the cornea, the latter should be moved said one millimeter distance away from said object, the mensuration of the cornea would result in a reading of approximately 0.28 D. more refractive power than the cornea possessed; i. e. approximately one third of a diopter error in mensuration.

The primary object of the present invention is to provide a generally improved instrument, simple in structure and cheap of manufacture, having no parts liable to get out of order due to wear, simple of operation, and having a more extended field of usefulness than its predecessors and adaptable to give mensural results not possible to said predecessors. A second object is to provide a headframe equipped with means for resting the forehead, means to prevent movement of the forehead away from its rest and measuring devices on the headframe for measuring the prominence of respective corneas relatively to the prominence of the forehead; said measurement of the prominence of the cornea, and thus of the eye, for diagnostic purposes, and said devices adapted to cooperate with other mensural means on the mensural organization of the instrument for locating respective corneas successively at a specified distance from the objects of the instrument, used for reflecting images.

Heretofore it has been the custom to employ either flat objects, or in certain instruments, a spherically curved pair of objects, while the present invention provides a plurality of pairs of cylindrically curved objects; one pair of said objects located and disposed very close to the axis of the iconoscope and they adapted for reflecting a pair of images on a cornea that has its axis aligned with the axis of said iconoscope very close to said axis of the cornea and said pair of images thus occupying the polar area of the pupillary area of the cornea. Heretofore it has been the custom to carry the objects used to reflect images, either on a flat disk, on a concave disk, on an arc, or on swingable arm members, while the present invention has for another object to provide a cylindrically curved arcuate mire box having a cylindrically curved face and attached fixedly, yet detachable, on the end of the iconoscope tube adaptable to be revolved in unison therewith and having no parts to get out of order and no parts to become unadjusted from wear. Heretofore it has been the custom to employ, either one pair of objects, a single object, or two pairs of objects, the latter having one pair disposed at right angles to the other pair, and to illuminate the objects before starting the measurement and to keep them lighted throughout the measurement; whereas the present invention provides a multiplicity of pairs of objects, one of each pair disposed on the cylindrically curved face of the mire box to each side of the axis of the iconoscope, and electric lights, one for each object adaptable to illuminate each object independently, said objects and lights adaptable to be manipulated to illuminate one object suitable to reflect an image close to the pole of a cornea and to illuminate a second object suitable to reflect a second image on said cornea, on the same meridian thereof, near the periphery of the cornea and to the opposite side of the pole; said illuminating means adaptable to illuminate the objects in elective pairs suitable to reflect many different combinations of images on the cornea; and said illuminating means adaptable to illuminate the objects successively suitable to build up a continuous series of images across a cornea on any elected meridianal diameter thereof.

Heretofore, in those instruments embodying movable doubling means or prisms, it has been the custom to employ rack and pinion mechanism or like mechanism for moving the prisms. Mechanism of this kind, even when new, always permits of a certain amount of loose play, known as backlash, and such mechanism is not the most adaptable for moving a body from inertia the infinitesimal short distance often required in moving the prisms to measure small errors of refraction, therefore, another object of the invention is to provide a spiral cam device for moving the prisms or image-doubling elements of the instrument. And because the greater the adaptable distance of movement of said prisms the wider is the possible adaptable range of mensuration, said spiral cam is provided adaptable to move the prisms a relatively long distance, and to extend the mensural usefulness of the instrument, interchangeable prisms are provided adaptable to be interchangeably mounted in the tube carrying the prisms. The said spiral cam device being simple of construction and having no parts to wear will have a long life of usefulness without said backlash, which same increases with wear in said rack and pinion mechanism.

A further object of the invention is to provide adjusting mechanisms for the instrument suitable to adjust the head of a patient comfortably in the headframe before the objects of the mensural organization, to adjust the chin for comfort, to secure the head against movement away from the headrest, and also to provide cooperative adjusting means adaptable to bring quickly into alignment the axis of the cornea and the axis of the iconoscope by a small vertical movement of the headframe and a much greater vertical movement, in the opposite direction, of the mensural organization, in order to make said adjustment without discommoding the patient.

With these and other objects in view my invention consists in the construction, combination, in the location and in the arrangement of parts, as hereinafter set forth and shown, and finally particularly pointed out in the appended claims.

In the drawings forming a part of the specification, Figure 1 is a vertical section of the invention. showing the mire box swung to its adaptable vertical position and showing a few parts in elevation. Figure 2 is a perspective view of the headframe, looking from the operator's position, and showing the craniostat attached to the opposite side of the frame from that shown in Fig. 1, and showing its support in section, on line 1—1 of Fig. 3. Figure 3 is a perspective view of said support or arm carrying the headframe, it being sectioned on line 2—2 of Fig. 1 and on line 3—3 of Fig. 2. Figure 4 is a perspective view of the thumb-wheel, and Figure 5 a side elevation of the screw for supporting and operating the chinrest, they being shown sectioned in Fig. 1. Figure 6 is a perspective view of a fragmentary portion of the craniostat shown with its opposite end attached in cleats to the headframe in Fig. 2. Figure 7 a side elevation and section view of the head-pad-holder of said craniostat, and Figure 8 a perspective view of said head-pad, they being shown as assembled on the craniostat in Fig. 2.

Figures 9 to 12, inclusive, are detail views of parts of one cornea-prominence-measuring device of the pair shown mounted on the headframe in Fig. 2; Figure 9 being a perspective view of a graduated bar of said device mounted through a cleat on the side-member of the headframe and carries attached to its end a cornea-sighting tube, the latter shown in section in Fig. 10, and as mounted in Fig. 2; Figure 11 is a perspective view, sectioned midway of its ends, of a block 38, that carries said sighting tube; said block having pivotal connection on the end of said graduated bar, and Figure 12 is a perspective view of the screw adaptable for adjusting said bar endwise in its cleat in which it is shown as mounted in Fig. 1.

Figure 13 is a perspective view of the post 8, having a round-table like head, that supports said arm that carries the headframe, it being shown in section in Fig. 1 with its lower end pivotally connected to one end of an eccentrically fulcrumed lever underneath the roof of the base.

Figure 14 is a perspective view of the post 40 and its trough-like headblock 41 on which the mensural organization of the instrument is mounted, they being shown in section in Fig. 1, where the lower end of said post is shown connected to the opposite end of said lever, and said trough-like headblock shown engaging the far flange 48 of the first-carriage shown in Fig. 15. Said Figure 15 is a perspective view of said first-carriage of the instrument, it being shown in section in Fig. 1, as mounted on said headblock and adapted to be traveled in directions of line 4—4 of said figure. Figure 16 is a perspective view of the two cooperative sections of a second-carriage 62 of the instrument; said carriage, by means of its annular-collar is adapted to form a turntable-like engagement and support for the stem of the bracket 77 of the instrument; said second-carriage shown as mounted on the first-carriage and adapted to be traveled in directions at right angles to the line 4—4 of Fig. 1 has its far section shown in side elevation in this figure. Figure 17 is a detail view of the four screws 64 that tie the two sections of said second-carriage securely together, and Figure 18 is a detail view of a threaded-rod 69, and its hand-knobs, that extends through a threaded bore in the bodies of the sections of said second-carriage and has its ends journaled in the respective brackets 71 of the first-carriage; said rod 69 and the screws 64 are shown in section in Fig. 1.

Figure 19 is a perspective view, fragmentary, of the right and upper end of the bracket 77 of the instrument and Figure 20 a perspective view, also fragmentary, of the left and upper end of said bracket, showing the split-collars in which the iconoscope-tube is mounted, and shown in section in Fig. 1.

Figure 21 is a perspective view of said iconoscope-tube; Figure 22 a perspective view of the collar 165 carrying the objective-lens, they being shown sectioned in Fig. 1; and Figure 23 is a side elevation and section, on an enlarged scale, of a fragment of said iconoscope-tube, the collar 165, the objective-lens 150 and also showing the short detachable collar 166 that fastens the lens in its collar and also permits ready removal of the lens to replace it with another of different strength or value, several of which having different refractive values are provided, and said collar 165 with its lens adaptable to quick removal to permit exchanging the prisms of the instrument.

Figure 24 is a perspective view of the ocular-tube 148 and of the two short lens-tubes 123 and 124, each of which carry two lenses of a four-lens-ocular provided for the instrument. A suitable number of the short tubes are provided in pairs, each carrying different lenses adaptable to cooperative refraction with certain objective-lenses provided to extend the scope of usefulness of the iconoscope. And other ocular-tubes 148 are provided for mounting said extra systems of lenses therein. Said ocular-tube and its tubes and lenses are sectioned in Fig. 1.

Figure 25 is a perspective view of the prism-tube 92 and its operating arm 91; Figure 26 is a perspective view of the member connecting said arm to the prism-tube; Figure 27 is a perspective view of the collar 98 carrying the prisms 96; and Figure 28 is a side elevation and section view of said collar 98, the prisms 96 and the inner detachable collar 97' that secures the prisms in their collar and also permits readily removing the prisms therefrom to remount others provided in their place: the figure showing the finger clips adapted to facilitate quick removal of the collar 98 and its prisms, they being shown in section in Fig. 1.

Figure 29 is an enlarged vertical section, fragmentary, of the left end of the arm 91 and rollers 108 and 109, and the post on which they revolve; said post constructed to provide one center of revolution for the roller 108 and another and different center of revolution for the roller 109 to place said rollers, one in contact with one wall of the spiral channel of a cam, shown in Fig. 30, and the other roller in contact with the opposite wall of said channel. Said rollers are shown engaged in said channel in Fig. 1. Figure 30 is a perspective view of said spiral cam, it being shown mounted and adapted to revolve on the prism-tube 88 in Fig. 1.

Figure 30 is a perspective view of the spiral-groove-cam 106, shown in elevation in Fig. 1, and Figure 31 is a perspective view of the circular-disk 112 having on its face-surface unequally properly spaced diopter-graduations: the disk being shown in section in Fig. 1 attached fixedly to the end of said spiral-grooved-cam.

Figure 32 is a perspective view of the collar 102 that is shown in section in Fig. 1 encircling the iconoscope tube and carrying the arm 91 that carries the rollers that cooperate with the groove of the cam. Figure 33 is a perspective view of the collar 121 carrying the open indicator 122, both being shown in section in Fig. 1. Figure 34 is a perspective view of the wide collar 118 carrying an open indicator and a pendent indicator 120, all three members being shown in section in Fig. 1. Figure 35 is a perspective view of the wide collar 141 carrying the indicator 143 that is shown in section in Fig. 1. Figure 36 is a perspective view of the disk 132, bearing degree graduations and having an annular hub 133, that is shown in section in Fig. 1. Figure 37 is a fragmentary, detail view in section, showing an adaptable modification that eliminates the use of the arm 91 shown in Fig. 25 and the members shown in Fig. 26, in which modification the post 110 is secured fixedly in the upper wall of the prism-tube 92, extends upward through a slot in the tube 88 and, with its rollers 108 and 109 engaged in the spiral groove of the cam, operates the prism tube the same as if the members named were used; the spiral groove of the cam being cut clear through the walls of the cylinder forming the cam. Figure 38 is a perspective view of a heavy collar having a handle fixedly attached thereto and said handle carrying a blade that adapts the handle to means not only for revolving the instrument but also to means for locking the instrument against revolving, they being shown in section in Fig. 1. Figure 39 is a sectional view of the collar 126, that is shown in section in Fig. 1, that forms a recess about the iconoscope tube and permits quick removal of the collar of the arcuate mire to remove said mire.

Figure 40 is a perspective view of the detachable arcuate mire and its illuminating means, it being shown in section and connected to the iconoscope tube in Fig. 1, in which figure it is shown as if it were swung into its vertical position adaptable for measuring a cornea in the vertical meridian, the globes in the respective chambers of the mire being shown in section in said Fig. 1. Figures 41 to 48 inclusive, are respective diagrammatic views of reflected images of the F-shaped objects on the cylindrical face of the mire, one such object before each chamber thereof. Figure 41 shows the undoubled images of the objects a and b as they are reflected on a cornea when only chambers a and b are illuminated, and Figure 42 is a view of said single pair of images as they appear to the observer through the iconoscope, doubled for the purpose of mensuration. The remaining Figures 43 to 48, inclusive, are respective views showing the corneal images, as they are reflected and as they are reflected and doubled, when additional objects are successively illuminated to reflect their images on a cornea.

Figure 49 is a longitudinal section of a modification of the mechanism adaptable for moving the prism-tube; and Figures 50 and 51 are enlarged sectional views, fragmentary, of said modification being shown in Fig. 49.

The invention is carried out by means of an apparatus constructed substantially like that shown in the figures of the drawings: however, certain changes, such for instance as increasing the length of the spiral-groove-cam, adding a right-angled member to the mire, changing the shape or arrangement of the objects on said mire, and different arrangement of the parts of the apparatus may be resorted to without departure from the spirit and scope of the invention.

The apparatus, preferably and as shown, is constructed with a base 1 having a hollow interior, see Fig. 1, and angled flanges 2 at its ends suitable for clamping it to a suitable support. The roof of said base, toward its broad end, is constructed with a large cylinder-sleeve 3 and toward its narrow end with a smaller cylinder-sleeve 4; said sleeves, preferably made integral with said roof or fixedly attached thereto, open through the roof and extend a suitable distance above and also below the roof, to adapt them to means for maintaining verticularity of post-like-supports mounted through them. Through the wall of each sleeve proximal to the other sleeve is provided a vertical slot to admit the respective opposite ends of a lever 6 to the interior of the respective sleeves. Said lever 6, being provided with a horizontal slot at each end, is eccentrically fulcrumed on a pin 5′ secured through the walls of a lug-bracket 5, that preferably is made integral to the roof of the base. The inner walls of said cylinder-sleeves 3 and 4 are very smooth to permit freedom of movement of the posts 8 and 40 that are mounted movable through them. The post 8, being mounted adaptable to move vertically through the cylinder-sleeve 4, is provided with a vertical slot, upward in its lower end, the walls of which are parallel with the walls of the slot of said sleeve, and the one horizontally slotted end of said lever 6 projects inward through said slot of the sleeve and into the slot of the post and engages its slot on a pin 35 secured in the walls of the slot of the post. Said pin 35 supports the post 8 on the lever while the latter is adapted to oscillate up and down in the slot of the sleeve when it is operated to raise or to lower said post to raise or to lower the headframe, hereinafter described. Said post 8 is provided with a flat, circular head 9 that projects at right angles to the post, see Fig. 13, and in directions of the lever 6, see Fig. 1. Several suitably deep depressions, along a curved line, are cut into the table-surface of said head of the post, and forward of said depressions through said head is a round hole 9′ for the bolt 12, see Fig. 1.

An extension arm 10, see also Fig. 3, carrying said headframe, see also Fig. 2, is securely, yet swingably connected by the bolt 12 to the head 9 of said post, making said arm adaptable to be swung laterally to swing the headframe out of alignment with the iconoscope of the instrument. Said arm 10, at its connected end has a rightangled offset 11 the vertical wall of which is cut circular to contact with the vertical front surface of the head 9 of the post. Besides the hole 7 for the bolt 12 said arm has a threaded hole 7′ through it for a thumb-set-screw 15 provided that cooperates with said depressions in the head and is for locking the arm against movement in different positions when it has been swung in order to swing the headframe out of alignment with the iconoscope. Said bolt 12, see Fig. 1, fitted through the hole 7 of the arm 10 and through the hole 9′ of the head of the post, is secured by a washer 13 on its lower end and a pin 14 forced through a hole in the bolt below the washer.

To align and fasten, the arm 10 and its supported headframe 21 with the iconoscope of the instrument the thumb-screw 15 is screwed through the hole 7′ with its lower end in the central depression of the head 9, while to swing said arm with the headframe toward either side and out of alignment with said iconoscope the set-screw 15 is slacked out of said depression, the arm is thus swung around on its bolt 12 the desired distance and said set-screw reset into another depression of the head, the said screw thus securing the arm against further movement. The extended arm provides a space between the end of the base 1 and the chinrest to accommodate persons having a large bust.

As shown in Figs. 1 and 3, the arm 10 is provided with a transverse channel 10′ having upwardly converging walls, and while it will be left to arbitrary choice of the maker to dispense with said channel in constructing the member, yet said channel if provided may be used to engage the base of a suitably shaped support adaptable to give supporting attachment to certain adjuncts to the apparatus. At its distal end said arm 10 is provided with a horizontal slot 16, see Figs. 2 and 3, in which the thumb-wheel 17 having a threaded hole, see Fig. 4, is mounted and operates when it is revolved to raise and lower the chinrest 19, see Fig. 1. In vertical alignment with said threaded hole of the thumb-wheel is a hole through the arm 10, both above and below said thumb-wheel, and extending downward through said hole of the arm and through the threaded hole of the thumb-wheel is a small threaded-post 18, see Fig. 5, carrying the chinrest 19, see also Fig. 2, that is operated vertically for adjusting the chinrest by turning said thumb-wheel. Projecting inward from the wall of the hole of the arm, above said slot 16, is a small key 16′, see Fig. 3, and cut into one side of said threaded-post 18 is a narrow keyway 18′, see Fig. 5, both of which cooperate with the post and the wheel to keep the post from turning when the wheel is revolved to either raise or to lower the chinrest 19 suitable to place the chin of a patient at such elevation that his forehead is rested against the foreheadrest 22 of the headframe 21.

Said headframe 21 is formed, preferably, of a single bar of metal, said bar of metal being twisted at certain points and otherwise suitably shaped so that its side-members 21 have their flat sides parallel with the sides of the arm 10 and its upper and transverse section having its flat side vertical to form the foreheadrest 22, substantially as shown in Fig. 2. The lower ends of the side-members 21 are shaped at an angle suitable to be attached by means of screws to the opposite sides of the arm 10 at points near its free end. On the outer surface of one side-member 21 are fixedly attached a pair of open brackets 24 in which is detachably mounted the craniostat 25 of the headframe, see Fig. 2. Said craniostat 25, which same is made of a bar of resilient metal, is shaped with a squared vertical section 26 toward its lower end that fits snugly, yet detachably in said brackets 24 and when mounted therein is prevented from turning by them. Above said brackets the bar makes an obtuse angle and extending backward and upward is suitably curved for its whole length to direct its free end forward toward the foreheadrest 22 with which it cooperates both to position and to hold the head between them against movement, during mensuration of the eye. At its free end said bar 25 carries a connection member 27, see Fig. 6, that is suitably connected to the bar, preferably swiveled, to permit the member 27 to oscillate up and down for adjusting the head-pad 25' of the craniostat to the back of the head of the patient. Said connection member 27 is formed with a bored and tapped stem 27' on which a curved-edge circular basin 28, see Fig. 7, is fastened by means of its projecting collar 28' and a short screw through a hole in the floor of the basin and screwed into said tapped hole in said stem of the connection member 27. A head-pad 25' carried by the craniostat and adapted for contacting with the back of the head, see Figs. 2 and 8, is mounted in said basin by forcing its peripheral edge down inside and under the curved-edge of said basin.

The craniostat is operated as follows: The operator pulls backward and around on the bar 25 and swings it out of the way until the patient's head is adjusted to the foreheadrest, after which it is allowed to spring back to contact the pad in the basin with the back of the head, the oscillatable connection of the basin to the bar permitting the pad to adjust itself to the shape of the back of the head, thus keeping the forehead in contact with the foreheadrest yet not tiring the patient, if he so desires, and also permitting the patient to remove his head from the headframe without the assistance of the operator.

Mounted on said headframe are a pair of cornea-prominence measuring devices 29, 29 provided, see Figs. 2 and 1. Each measuring device embodies an adjustable bar or arm 29, see also Fig. 9, that is movably mounted through a squared bracket 30 attached, by suitable means such as screws, to the outer surface of a respective side-member 21 of the headframe. A thumb-screw 32, see also Fig. 12, is provided in a tapped hole in each said bracket 30, which screw extends through a slot 31 in said bar 29 and has its end contacting with the outer surface of the member 21. The said screw is for adjusting the bar 29 forward or backward in its bracket for measuring purposes and, after a measurement has been made, tightening of said thumb-screw against the member 21 locks the bar against further movement. On the outer surface of each bar 29, along its slot 31, see Fig. 9, a scale 33 is marked that reads from zero at its center, minus 1, 2, 3, etc. in one direction and plus 1, 2, 3, etc. in the opposite direction. The said graduations are adaptable for denoting, through mensuration, if a respective cornea is more prominent than standard or less prominent than standard; and said graduations also are adaptable to cooperate with another measuring device carried on another part of the instrument and hereinafter described. For registering on said scale of the bar 29 a small indicator 34 is provided and is attached to the member 21 and extends across the latter's upper surface, see Fig. 2.

Pivotally connected to one end of the bar 29 is a small tube 36, see Fig. 10, inside of which are diaphragms 37 with their centers on the axis of the tube; said tube and its diaphragms being provided as the means of focusing across the pole of respective corneas for measuring. However, in lieu of said diaphragms other focusing means are contemplated without departure from the scope of the invention. Said tube 36 is mounted through a squared block 38, see also Fig. 11, having a hole inward from its back end to engage it pivotally on a rounded stem of the bar 29, on which it is secured by a pin 39 vertically through the block 38 and against the reduced neck made to the said stem of the bar. Said connection of the tube 36 to the bar permits the operator to elevate or to lower either end of the tube while sighting through the tube at the cornea and during said sighting he may adjust the bar 29 forward or backward in its bracket until he obtains a clear view directly across the pole of said cornea, at which time, having consummated the measurement of the prominence of the cornea, he tightens the thumb-screw 32 and takes his reading from the scale 33 as indicated by the indicator 34; said reading denoting the extent of prominence of that respective cornea, whether plus or minus, relatively to the plane of the patient's forehead. The devices for each side-member of the headframe 29 being alike, further description will not be necessary.

Besides their employment for measuring the prominence of corneas, as described, either device 29 is adapted to cooperate with another scale 58, see Fig. 14, and another indicator 59, see Fig. 15, that is operated by a first-carriage of the instrument, hereinafter described, to measure for and to locate each successively following cornea for measurement at a specified distance from the face of the arcuate unitary mire of the instrument. Said scale 58 and indicator 59 operated by the first-carriage and the devices 29 on the headframe permit the operator, in each successive examination to move the first-carriage, 49, see Fig. 1, just the required distance and in the proper direction to place the face of said mire, and also the plane of the objective-lens of the iconoscope, at said specified distance from the cornea about to be measured, thus assuring of an accurate mensuration of said cornea. These features of the present invention being of primary importance they are more fully dealt with in following paragraphs that deal with said first-carriage.

The post 40, see Fig. 14, mounted through the cylinder-sleeve 3, see Fig. 1, and carrying the mensural organization of the instrument, is provided with a trough-like rectangular headblock 41' hereinafter described. For threadedly cooperating with the threaded-hub of a hand-wheel 43, the said post is also provided with coarse threads 41, running a few threads to the inch suitable to produce rapid vertical movement of the post, cut deeply into its outer surface, and said threads engage the threads made in the hub of the said hand-wheel 43, provided. The said hub of the hand-wheel being threaded onto said post before the latter is lowered into its sleeve; after which, as shown in Fig. 1, said hub of the wheel has its lower surface contacting with the upper end surface of the cylinder-sleeve and its upper surface proximal to the under surface of said trough-like headblock 41'. The said post 40 has a vertical slot, upward in its lower end, the walls of which are parallel with the walls of the slot of the sleeve 3 through which latter slot the lever 6 extends to engage a pin 35' suspended across said slot of the post. Said pin 35', having its ends secured in the walls of the slot of the post, is engaged by a short horizontal slot in the end of said lever 6, which same slot oscillates about said pin 35'.

Extending from the lower end upward in the center of said post 40 is a spacious bore in which a traction spiral-spring 42 is suspended on a suitable screw fixedly secured in a tapped hole in the roof of said bore, see Fig. 1. The spring 42 is attached in place, before the post is placed in its sleeve and before the pin 35' is secured in place; this is accomplished by inverting said post and lowering the spring, it carrying its attaching screw in the eye formed by its topmost coil, in the bore and following the screw with a screwdriver passed down in the barrel of the spring to drive said screw into its tapped hole in the roof of the bore. After said post has been mounted in its sleeve, a link suspended from the lowermost coil of said spring passes downward to one side of the pin 34', the latter now attached in place, and is held taut by a small bridge 3' which passes through said link and is attached at its ends to the lower end surface of the sleeve 3 by means of screws.

The lever 6, which same is mounted after the posts 8 and 40 have been mounted in their respective sleeves, is mounted by first introducing the lever upward into the slots of the respective sleeves and posts and, first engaging the slot of the shorter section of the lever on its pin 35 and then moving the lever in that direction until the slot at its other end will pass onto the pin 35' of the other post, and then adjusting the lever lengthwise in its bracket until the fulcrum-pin 5' can be and is placed in place to support the lever.

The said hand-wheel 43, see Fig. 1, preferably and as shown formed with pendent lugs 44, spaced at intervals along its circumference to facilitate its operation, when revolved in one direction elevates the post 40, thus placing the spring 42 under stress, and elevates all members of the mensural organization of the instrument assembled on said headblock 40' and at the same time elevates the end of the longer section of the lever 6 and lowers the end of the shorter section of said lever and thus synchronously lowers the post 8 with its headframe and supported members; the distance of downward movement of said post 8 being less than half the distance of upward movement of the post 40. As stated, the upward movement of the post 40 places the spring 42 under stress so that when the hand-wheel is revolved in the opposite direction and gradually releases said post of its support the traction produced by recoil of said spring combined with the ponderosity of the members carried by said post forces the latter downward and, through the lever, forces the post 8 upward and elevates the headframe and its members.

It is obvious that the respective ends of said lever engaged as they are in the slots of the respective posts prevents the latter from turning in their cylinder-sleeves and also prevents loss of alignment of the members carried by said posts.

My object in placing the fulcrum for the lever 6 at a point nearer to the post 8 than to the post 40 is to provide means to produce a minimum vertical movement of the headframe relatively to that of the mensural organization of the instrument so that the operator need not incommode his patient after he has postured him for examination, and yet to have provided means adaptable to cause an equalizing vertical movement of the two sections of the instruments, maximum in one and minimum in the other, that permits the operator to quickly align the axis of the optical system thereof with the axis of his patient's cornea located for measurement.

Said trough-like headblock 40', see Figs. 1 and 14, is fixedly attached on the upper end of said post 40 by means of screws 99 that have their heads countersunk flush with the surface of the floor of the trough. Said headblock is formed with a flat floor and parallel vertical side-walls, while in the respective side-walls are provided squared grooves 47 extending from one end of the block to the other. Said grooves 47 serve as runways for the flanges 48 of the first-carriage 49; said flanges of said carriage being adapted to move slidingly in their grooves when the carriage is propelled by the threaded-rod 50 in directions of the base 1, see Fig. 1. The said rod 50, operating as it does through a threaded-bore 51 made through the center of the body of the carriage, has its shaft supported in a bearing of a bracket 52 carried at the end of an arm 53 that is aligned with the floor of the trough 40' to which it is rigidly attached by screws 54. The rod is secured against endwise play by a taper-pin 56 through the rod and by the hub of the hand-wheel 57 that is provided for turning the rod to move the carriage, said hand wheel 57 being secured to the rod by another taper-pin 55. Operation of said carriage is hereinafter explained.

The scale 58, mentioned in preceding paragraphs, is marked along the upper surface of the right side-wall of the headblock 40', see Fig. 14, above the groove 47 in which the right flange 48 of said first-carriage travels and, to cooperate with said scale, the small indicator 59 is mounted, by means of screws, on said first-carriage, see Fig. 15, in a position suitable to engage said scale when said first-carriage is operated or moved in directions of the length of the base. The said scale, marked to read from zero at its center, minus 1, 2, 3 etc. in one direction and plus 1, 2, 3, etc. in the opposite direction, with its indicator 59 is adapted to cooperate with either one of the measuring devices 29 on the headframe; their cooperative operation being as follows: With the patient's forehead resting against the foreheadrest, the operator first employs a device 29 and measures the distance obtaining between the plane of his patient's cornea and the plane of said patient's forehead, contacting with the foreheadrest 22, and, taking the result as registered by the indicator 34 on the scale 33 he compares it with that graduation on the scale 58 registered by the indicator 59 and, for example, if the corneal reading on scale 33 is plus 2 while the carriage reading on the scale 58 is minus 1, it is indicated at once that he should travel said carriage in a direction away from the cornea until the indicator 59 registers on the graduation plus 2 of the scale 58. This operation of said first-carriage placing the face 188 of the mire, the optical system, and the complete mensural organization of the instrument at the specified distance from the plane of the cornea located for measurement, assures of correct mensuration of the cornea.

The said first-carriage 49, see Figs. 15 and 1, incompletely described in the preceding paragraphs, is constructed with vertical end-walls on the inner side of each of which is cut a squared groove 60 in which is movably engaged a respective side-edge 61 of the base of a second-carriage 62. The floors of said grooves 60, of said first-carriage, are each just a trifle above the level of the upper surface of the respective side-walls of said headblock 40' so that when said side-edges 61 of the base of said second-carriage are engaged in said grooves the lower surface of said second-carriage will be free to move in directions at right angles to the paths of travel of the first-carriage and transverse of said first-carriage and across the upper surface of said side-walls of the headblock 40'.

The said second-carriage is made in two connectible sections 62 and 62, see Fig. 16, one of which has four parallel bores 63 made through the body of its base through which slender bolts 64, see Fig. 17, extend and screw into complemental tapped bores 65 of the other section 62 to tie them together as if they were one member. Through the body of the base of both sections, and extending parallel with the bores 63 described, is another tapped bore 72 for the threaded-rod 69, see also Fig. 18, while just below said bore 72, parallel with it and cut inward from the under surface of both sections 62, 62, is a squared recess or groove 66 which same fits down over, yet free of, the rod-carrying-frame 70, see Figs. 15 and 1. On the upper surface of each section 62 of said second-carriage is constructed a member that forms one-half of an annular-collar 67 having a squared annular-groove 68 in its inner wall, see Figs. 16 and 1. If it is found to be preferable, said half-collars 67 can be made as separate pieces from their base 62 and fixedly attached thereto by suitable means.

For the purpose of carrying the threaded-rod 69, see Fig. 18, that is provided and adapted for moving the second-carriage in directions at right angles to the length of the base and transversely across the first-carriage, the said frame 70 is mounted on said first-carriage. Said frame 70 is formed with vertical brackets 71 at its respective ends and the brackets made with bearings for the rod 69. Said frame 70 is supported on two small bridges 73 that are fastened by screws to the floor of the carriage. Said bridges 73 support said frame at sufficient elevation for it to clear the upper surface of the side-walls of said headblock 40' and to thus permit movement of said first-carriage on said headblock 40'. Said frame 70 is secured on the bridges, and thus to the carriage, by means of screws 74 through holes at its middle and screwed into tapped holes in the floor of the carriage. However, before the screws 74 attach the frame 70 in place the two sections 62 are placed on the frame and it and the members 62 are moved laterally far enough to allow the edges 61 of the base of the second-carriage to slip into the grooves 60 of the first-carriage, after which they are moved to the center of said first-carriage and the members 62 separated enough to allow the screws 74 to be placed in their holes and screwed into said tapped bores in the floor of the first-carriage and thus to fix said frame firmly in place. The members 62, although not yet tied together can not now escape from the first-carriage.

A bracket 77 is provided, it carrying the iconoscope-tube 88 on which the members forming the mensural organization of the instrument are assembled, see Fig. 1. Said bracket 77 is constructed with a stem 76 projecting downward from near the center of the lower surface of its base section, and said stem 76 at its lower end is provided with an annular-flanged base 75, see Fig. 1, that is engaged in, fits snugly in, and is adapted to be turned in said annular-collar 67 of said second-carriage 62 shown in Figure 16 and the far section of which is shown in Figure 1. Said annular-flanged-base 75 of the stem 76 is lowered into its place, as shown in Fig. 1, while said annular-collar 67 is yet open due to the separation of the sections 62, 62, after which said collar 67 is closed around said flanged-base 75 and said sections 62, 62 brought together and tied securely together by said bolts 64, shown in Fig. 17, which are placed through their respective bores of one section 62 and screwed home in the tapped complemental bores of the other section 62. Said annular-collar 67 of the second-carriage cooperating with said annular-flanged-base 75 and stem 76 of the bracket 77 provide a turntable-like arrangement that permits the operator of the instrument to swing the iconoscope thereof either toward the right or toward the left to align the axis of said iconoscope with the axis of an eye located at the headframe. To lock said base and stem against turning after the iconoscope has been swung laterally into a desired direction, a thumb-screw 78 is provided which screws through a tapped hole through the annular-collar 67 and against the surface of the stem 76, see Fig. 1.

Said threaded-rod 69, carrying a hand-knob 79 secured thereon by a taper-pin 80, is next placed through its bearing of the bracket 71 of the frame 70 and extended through the threaded bore 72 of the connected sections 62, 62 of the second-carriage and thence on through its bearing of the opposite bracket 71 of said frame 70, after which the other hand-knob 81, provided, is fixed on its opposite end by a taper-pin 82. Said hand-knobs 79 and 81, contacting against the outer surface of the respective brackets 71 lock the rod against endwise movement while said rod when revolved is adapted for moving said second-carriage in directions at right angles to the length of the base and at right angles to the direction of travel of said first-carriage. And said transverse travel of the second-carriage is adapted for moving the mensural organization of the instrument from a position before one eye of a patient over to a position before his other eye.

For the purpose of making adjustments of the instrument, by operating the hand-wheel 43 and thus the post 40 the operator elevates the first-carriage, the second-carriage, the iconoscope and all members of the mensural organization to a desired elevation while he at the same time lowers the headframe, less than one-half the distance, yet to an equal elevation, or vice versa, lowers the former named members while elevating said headframe for the purpose of aligning the axis of said iconoscope with the axis of an eye located at said headframe. By operating the hand-knob 57 he may move said first-carriage and said members carried by it in directions of the long axis of the base 1 to locate the objects on the mire and said members of the mensural organization at the specified distance for correct operation of the mensural organization of the instrument. By turning either hand-knob 79 or 81 he may move said second-carriage on said first-carriage in directions at right-angles to said long axis of the base and from a position before one eye of a patient over to a position before the fellow eye. And by slacking off the thumb-screw 78 the operator may swing the bracket 77 on its turntable-like support to align the axis of said iconoscope with the axis of either eye of a patient located at said headframe for the purpose of comparing one eye with the other, or he may swing said bracket to a position at rightangles to said long axis of the base and then lock it in said position while he is changing certain components of the iconoscope, or for other purposes.

The said bracket 77, see Fig. 1, is constructed with vertical end-supports 83 and 84, which same are shaped at their upper ends into open half-collars 85 and 86 on which the iconoscope-tube 88 is supported. To complete the two circular bearings in which said tube 88 is mounted, half-collar-caps 87 and 87' are provided. The complete collar or bearing of the support 83, see Fig. 20, in which the ocular-end of said iconoscope-tube 88 is mounted, and adapted to be revolved, is smaller in diameter than the complete collar or bearing of the support 84, see Fig. 19, the latter being larger to adapt it to receive a collar 126 provided, see Figs. 1 and 39, and attached by a screw 127 to the iconoscope-tube 88. Said collar 126 being attached to said tube 88, revolves in the circular bearing or collar of the support 84 that carries the objective-lens-end of said iconoscope-tube.

Preferably and as shown in Figs. 1 and 19, the support 84 has a squared recess 225 that is provided with a cap-closure 226 and extending from said support 84 toward the operator's end of the base of the bracket is a flat table-like member, at the end of which is a vertical bracket; said recess in support 84 and said table are provided to permit the operator to mount adjuncts that may be useful in operation of the apparatus thereon or to suspend adjunct carriers through said recess, however, it is obvious that said support 84 may be formed without said recess and the bracket without said table.

Said iconoscope-tube 88, see Figs. 1 and 21, is constructed with sufficiently thick walls to maintain rigidity of it and to adapt it to provide rigid support to the members of the mensural organization of the instrument assembled on it. Through the lower wall or floor of said tube 88 is a long narrow slot 89 in which the vertical section 90 of the prism-tube-operating-arm 91 is adapted to move during mensural movement of the prisms 96 carried by said prism-tube, see Figs. 25 and 26, also Fig. 1. Said prism-tube 92 is mounted in the iconoscope-tube 88 by pushing the tube 92 forward far enough to permit the horizontal member 93, at the top of the vertical section 90 of the arm 91, to pass up through the slot 89 and into a small recess 94 cut into the lower surface of the prism-tube 92, and said horizontal member 93 is secured, preferably by screws or rivets in the said recess, or soldered therein, thus uniting the arm 91 with the prism-tube 92 and adapting said arm to act as means for tractively moving said prism-tube, with its prisms, in said iconoscope-tube in directions of the axis of the latter. Said vertical section 90 is fitted snugly into a squared hole in the arm 91 and fixedly secured therein by a screw or by a pin, see Figs. 1 and 25. It is obvious that the floor of the prism-tube 92, no matter to what point it may be moved, closes said slot 89 continuously against admittance of light rays to the iconoscope.

The one pair of prisms 96, of the several pairs provided for the instrument, are suitably mounted in a short collar 97, see Fig. 28, that fits snugly into the end of the prism-tube 92, see also Figs. 1 and 25; said collar 97 is provided with small keys 98, see also Fig. 27, one projecting upward and the other projecting downward from its exterior surface and in line with the line of union of the pair of prisms. Said small keys are adapted to engage in keyways, that are cut inward in the end of the prism-tube 92, when said collar 97 with its prisms is fitted in the tube, the keys and keyways thus preventing the prisms from turning in the tube. And, constructed near the right end of said collar 97 is a finger-clip 100 that facilitates removal of the collar with its prisms, without removing the prism-tube 92, at those times when certain optical components of the iconoscope are to be changed.

Said prism-collar 97, see Fig. 28, is constructed with an annular abutment, on its inner surface toward its forward end, against which the peripheral edge of the combined prisms 96 contact, and a short collar 97' is provided that fits friction tight in said collar 97 with its end surface set against the opposite surface of said prisms to fasten the latter in their collar and to maintain them in correct position therein. If it is thought preferable, said prisms 96 may be cemented to a disk of plane glass and edged to fit in said collar, and if preferable, said collar 97' may be threaded into the collar 97.

The invention provides two other collars like the collar 97, not shown in the drawings because they are duplicates of the one shown. One of the said extra collars is provided with a pair of prisms having double the power of the pair shown while the other said extra collar is provided with a pair of prisms having one-half the power of the prisms shown. Each pair of said prisms, with their collar, are adaptable to be interchangeably mounted in said prism-tube 92, see Fig. 1, and each respective pair of prisms are adapted for mensural use cooperatively with all other members of the instrument. However, when that pair of prisms having half-power are employed to measure curved surfaces having a shorter radius of curvature than is commonly found possessed by corneas of human eyes, the finding of mensuration as registered on the scales of the disk 112, are read by multiplying the reading shown by two, and when the prisms having double power are employed to measure corneas having longer radius of curvature than is commonly found possessed by corneas of human eyes, the finding of mensuration as registered on said scales of said disk are read by dividing the reading shown by two. Said auxiliary prisms are provided to extend the mensural use of the instrument to include mensuration of corneas having those defects known as conical-cornea and aplanatio-cornea.

A wide collar 102, see Figs. 32 and 1, is provided, it being constructed with a pendent section 103 having an inverted T-shaped opening horizontally through it, and a lug 104 projecting upward from the upper surface of the collar 102 through which a hole is bored. Said collar is placed on the tube 88, before the latter is mounted on its supports, is passed toward the right, the arm 91 carrying the rollers 108 and 109 threaded through said opening in the pendent section, and fastened in place on said tube 88 by a screw 105 through the hole in said lug 104 and into a tapped hole in said tube. Said collar 102 serves as an abutment against which one end of a cylinder spiral-cam 106, hereinafter described, contacts while said pendent section 103 serves as a support and its opening serves as a guide for said arm 91 that moves the prism-tube.

Said small rollers 108 and 109, both equal in diameter but the roller 108 having the smaller opening, are mounted on a small post 110 that is shaped with a larger section on which the roller 109 revolves and a reduced section on which the roller 108 revolves, thus providing a different center of revolution for each roller, see Figs. 25, 29 and 1. Said post is mounted fixedly and secured by a screw 111 in a hole in the arm 91 near its end, and the rollers are fastened on the post by a washer 108' sunk in the roller 108 flush with its upper surface and a screw 109' through said washer and into a tapped hole in said post.

The hollow cylinder 106 of which the said spiral-cam is formed, see Fig. 30, is constructed with suitably thick walls for permitting of cutting the spiral-channel suitably deep, and the cylinder is just large enough of inside caliber to fit snugly on the iconoscope-tube 88, see also Fig. 1, on which it is adapted to be revolved freely for operating the prism-tube. The said spiral-cam is formed by cutting a spiral-groove 107 deeply inward in said hollow cylinder from its outer surface, the said groove being cut sufficiently deep to just leave a thin but smooth floor to the groove. The said cylinder has its left end fixedly attached to the disk 112, which same is adapted for use to revolve the cylinder (and thus the spiral-cam) for traveling the prism-tube for mensurally moving the prisms of the instrument, and the said spiral-groove, having its left end very close to said disk, extends spirally once around the outer part of the cylinder and terminates at a point very close to the right and free end of the cylinder. The opposite side-walls of said spiral-groove are each squared and are each perpendicular to the axis of the cylinder at all points of its length. The length of said spiral-groove is sufficient for accomplishing very extensive mensural movements of the prisms (or doubling-elements) of the instrument. However, if it is thought advisable to give to said prisms a more extensive distance of mensural movements, the said cylinder 106 may be made longer and the said groove, by having less pitch, extended in length; or, the cylinder could be made longer and the groove could be continued on around the cylinder a second turn.

The said rollers 108 and 109 each, being mounted as they are eccentric to each other on the said post 110, engaged in said spiral-groove, and supported and maintained in said groove by the collar 103 that guides the arm 91, contacts at all times with but one sidewall of the groove, while the other roller contacts at all times with the opposite wall thereof so that when the cam is revolved, through means of the disk 112 hereinafter further described, each roller revolves at the same time, one by contact with one wall and the other by contact with the opposite wall of the groove the rollers both moving in the same direction of the groove yet revolving in opposite directions to each other. Revolving the cam in one direction forces the rollers toward the right end of the cylinder and revolving it in the opposite direction forces the rollers toward the opposite end of said cylinder. And because one roller contacts with each wall of the groove and because the rollers stop rolling and also start rolling simultaneously with each other there is no backlash made manifest at the time of changing the direction of movement of the prism-tube and its prisms in measuring curvature of a cornea.

Said disk 112, see Fig. 31, is constructed with a hub 113 having holes 114 horizontally through it for screws 117, see also Fig. 1, that attach said disk rigidly to the left end of the cylinder 106 of the spiral-cam. Preferably, and as shown, a triple scale 116, see Fig. 31, having a diopter-graduation circle, a radius-of-curvature-graduation circle, and a hyperopic-and-myopic-indicating-graduations circle, is marked on the face of said disk 112. The said scale made adaptable to be read from the operator's seat.

Preferably, the graduation lines of said triple scale are marked radially inward toward the axis of the iconoscope along the periphery of the face of said disk; and in order to correctly space the graduation lines of the diopter circle of said triple scale, attention should be given to the table on page 2, by which it is shown that for each millimeter of difference in length of radius of corneas given therein from a 5.8 mm. radius cornea to a 10.8 mm. radius cornea, there is a constant increase of 0.062,500 mm. in the size of image for an increase of a millimeter in length of radius. If, (as is in said table shown and as drawn from textbook data), a standard cornea has 7.8 mm. radius of curvature, giving it plus 42.7307 diopters refractive value, we compare the size of the image reflected by a 7.8 mm. radius cornea with the image reflected by a 8.8 mm. radius cornea and then compare said image on said 7.8 mm. radius cornea with the image reflected on a 6.8 mm. radius cornea, I find that the increase in size of image in the first comparison is 0.062,500 mm. which is equal to the 0.062,500 mm. decrease in size of image in the second comparison. However, when I compare the dioptrical value of said 7.8 mm. radius cornea with the dioptrical values of said 8.8 mm. radius cornea and with said 6.8 mm. radius cornea, I find that the difference in diopters is 4.8557 D. between said 7.8 mm. radius cornea and the 8.8 mm. radius cornea, while the difference in diopter value between said 7.8 mm. radius cornea and said 6.8 mm. radius cornea is 6.2840 D. or 1.4283 D. variation. Therefore, it is obvious that while all graduation-lines of the radius of curvature circle of said triple scale are equally spaced from each other, the graduation-lines indicative of diopters of refractive value are unequally spaced; that is, the greater the diopter power to be represented by graduation-lines the closer is the indicative graduation-lines, and beginning with the highest diopter number and proceeding toward the lowest diopter number the graduation-lines are gradually and increasingly wider separated: no two diopter lines are equally spaced while every radius of curvature lines are equally spaced around their circle of the scale.

Because said disk 112, bearing said triple scale, is fixedly attached to said cam to revolve the cam to move the prisms 96 which double the different sized images on respective corneas to measure the curvature thereof, and thus the refractive value thereof, and because said spiral-groove 107 of the cam has equal prism-moving-pitch throughout its course, on the said disk, that graduation-line adapted for indicating a normally curved cornea, said line marked by the character E, is in line horizontally with the central point of said spiral-groove, so that when the disk is revolved in one direction to move said prisms to measure respective corneas having curvature greater than standard, shorter radius than 7.8 mm. and greater refractive value than 42.75 D., the graduation-line indicative of the radius of curvature, the graduation-line indicative of the diopters of refractive value, and the graduation-line indicative of the amount of myopic refraction of said cornea are brought into view through the indicators 119 and 122, hereinafter described. And, vice versa, when said disk is revolved in the opposite direction to move said prisms in the opposite direction to measure respective corneas having curvature less than standard, longer radius than 7.8 mm. and less refractive value than 42.75 D., the graduation-line indicative of the radius of curvature, the graduation-line indicative of the diopters of refractive value, and the graduation-line indicative of the hyperopic refraction of said corneas are brought into view through said indicators.

Because about ninety-eight per cent of all eyes presented for examination have corneas ranging between 6.7 mm. radius of curvature and 9.1 mm. radius of curvature, and have refractive value ranging between 49.75 D. and 36.75 D. refractive power, and because the greater is the adapted distance of movement of the prisms as provided for measuring one diopter of refractive error the greater will be the accuracy of mensuration, the disk 112, as shown, is preferably, graduated adaptable for measuring corneas ranging between plus 36.75 D. and 49.75 D. refractive value, or ranging between 9.1 mm. radius and 6.7 mm. radius of curvature.

Although it is arbitrary to choice, preferably, the central circle of said triple scale is divided by a cross line that is even with said E that divides the outer circle and said line is denoted by 7.8 mm., from which toward the right are graduation-lines equally spaced, (said spacing based upon a careful calculation based upon the table given, or upon a like table or other data found in prevailing text-books, the power of the prisms used, the distance from corneas located for measurement to the objects on the mire, and the size of said objects), and the successive graduation-lines marked to be read as 7.9 mm.; 8 mm.; 8.1 mm.; 8.2 mm.; 8.3 mm.; 8.4 mm.; 8.5 mm.; 8.6 mm.; 8.7 mm.; 8.8 mm.; 8.9 mm.; 9 mm.; and 9.1 mm., and toward the left from said 7.8 mm. line the graduation-lines, also equally spaced marked to read 7.7 mm.; 7.6 mm.; 7.5 mm.; 7.4 mm.; 7.3 mm.; 7.2 mm.; 7.1 mm.; 7 mm.; 6.9 mm.; 6.8 mm.; and 6.7 mm., these graduations adapted for registering results of mensuration of corneas in their respective radius-of-curvature values in millimeters and fractions of millimeters. The innermost circle of said triple scale is divided by a cross line that is also even with said E of the outer circle and said cross line is marked to denote 42.75 D. and from it toward the right are graduation-lines that are successively wider spaced, (also spaced according to calculation based upon said table and data named above), the first graduation-mark reading 42.00 D., and successively following it, 41.00 D.; 40.00 D.; 39.00 D.; 38.00 D.; 37.00 D.; and 36.75 D., and from the said 42.75 D. graduation towards the left are graduation-lines successively more narrowly spaced and each marked to be read successively, 43.00 D.; 44.00 D.; 45.00 D.; 46.00 D.; 47.00 D.; 48.00 D.; 49.00 D.; and 49.75 D. Between each two of these graduation-lines the spaces are subdivided and marked suitable to denote fractions of diopters. The graduations of this scale are adapted for registering results of mensuration of respective corneas in diopters of refractive value. Said outermost circle of the triple scale, divided at its center by a line marked by said E, is marked off by unequally spaced graduation marks, (the spacing calculated as described above) and toward the right said graduation-marks are denoted by characters 1, 2, 3, 4, 5, 6 and 7, either printed in red or having the minus sign before the respective characters to denote hyperopic refraction, in amounts designated by the numerals, and from said E-line toward the left are like graduation-marks, also unequally spaced, (the spacing calculated as above mentioned) and the graduation-marks marked to read 1, 2, 3, 4, 5, 6 and 7, and either printed in white or having the plus sign before each character to denote myopic refraction, in amounts designated by the respective numerals.

By those versed in the art it is readily understood that the prisms 96 to be employed, while to a certain extent it is arbitrary, depends largely upon the distance specified for the objects from corneas that reflect the images, the size of said objects and the specified distance of mensural movement of said prisms. However, no matter what is the power of the prisms that are employed for regular use, the auxiliary prisms supplied, and described in preceding paragraphs, are one pair, as stated, one-half the power of the regular prisms while the other pair is doubled the power of said regular prisms; and as has been stated the result of mensuration as it would be registered on said scale of the disk 112 would be read, when the weaker prisms were employed by dividing the result by two, while when the prisms of double power were employed the result would be multiplied by two.

While the scales as described are adaptable for registering results of mensuration while dealing with corneas ranging in radiuses of curvature between 6.7 mm. and 9.1 mm. It is obvious that if the groove of the spiral cam was made longer and adaptable to move the prisms a greater distance then more graduations could be added to said scales and thus the limits of mensuration be extended.

Four crescent-shaped openings 114' are provided in said disk 112, see Figs. 31 and 1, that permit the operator to see his patient without looking around the disk, as is fully explained hereinafter.

A collar 121 is provided, see Figs. 33 and 1, it being constructed with an arm having an open indicator 122. Said collar is passed onto the tube 88 and onto the hub 113 of the disk 112. Said collar fits snugly on said hub, yet loose enough to permit the operator to revolve to move said indicator 122 from one graduation to another on said disk, yet the collar is still tight enough on said hub to be revolved with it when the disk is revolved, and thus after the indicator 122 has been placed to register on certain graduations of said triple scale, when the disk is revolved the indicator continues to register said graduations. Said indicator 122 is spoken of as a movable indicator because it is made adaptable to be manually moved to register on different graduations of the scale, however is revolves when the disk 112 is revolved, with the tube 88 and the mire 181 remaining stationary, and also revolves with said disk and mire at times when they are revolved. And it also revolves in unison with the disk, the tube 88 and mire 181 remaining stationary, while the prisms are being moved to measure in any meridian, it of course continuing to mark the graduation over which it has been placed while a second indicator, hereinafter described, comes to register on the graduation indicative of the second mensuration.

A wide collar 118 is provided, see Figs. 34 and 1, constructed with a flange 118', with an arm having an open indicator 119, mentioned above, and with a horizontal member carrying a pendant indicator 120. Said collar 118 is placed on said tube 88 with its right side surface contacting with the hub 113 of the disk 112 and its flange 118' contacting with the left side of the collar 121 and is, at this point, fastened to the tube 88 by a screw 125 through the body of the collar and into a tapped hole in the tube; the flange 118' thus locks the collar 121 in place on the hub 113 of the disk 112, while the collar 118, at one end, and the collar 102 at the opposite end of the hollow cylinder of the cam 106 secures the disk and cam against endwise play on the tube 88, yet permits the operator to revolve said disk and cam, with the tube remaining stationary, to move the prisms 96 inside the tube 88 for mensural purposes.

Said collar 118, being as it is fastened fixedly to the tube 88, its two indicators 119 and 120 revolve only when, but obviously always when said tube 88 is revolved for the purpose of placing the long diameter of the mire 181 over a different and new meridian of a cornea under measurement. During the time that the mire 181, cam 106, disk 112 and the tube 88, in unison, are revolving the indicator 120, suspended downward before the degree scale 135, on the face of a smaller disk 132, hereinafter described, moves around over said scale and, when the members named cease to revolve, it registers on said scale that degree of the meridian of a cornea over which the long diameter of said mire 181 is placed, that is to say the new meridian of the cornea that is then about to be measured.

The operation of the indicators 119 and 120, called stationary indicators because they can not be moved independently of other parts, is hereinafter fully described.

Another wide collar 141 is provided, see Figs. 35 and 1, constructed with an arm off from which extends a rightangled section that is bent downward at its end forming a pendent indicator 143. Said collar 141 is next placed on the tube 88 and its inner end extended across the collar 118 and against the left surface of the latter's flange 118', said collar 141 being just free of contact with the outer surface of said collar 118 so that when the latter is revolved it does not revolve the former.

The disk 132, see Figs. 36 and 1, mentioned above, it being constructed with a wide hub 133, with said degree scale 135, with holes 134 for screws, and with a crescent-shaped opening 135' adapted to cooperate with the respective like openings 114' of the disk 112 for viewing, is next passed onto the tube 88, its peripheral edge passed underneath the indicators 143 and 120 and its hub pushed into the collar 141 and against the left surface of the collar 118, and is kept in its place by being fixedly attached by means of screws, or by other suitable means, to the support 83 of the bracket 77, hereinafter described.

A long collar 126 is provided, see Figs. 39 and 1, it being constructed with an annular offset 129 to its inner surface, and is next placed on said tube 88 near its right end and attached fixedly in place by a screw 127 through a hole 128 in its thicker section and into a tapped hole in said tube 88. Said offset 129 in the collar forms an annular recess between its inner surface and the outer surface of the tube in which the attachment-collar 184, see Figs. 40 and 1, of the unitary mire 181 has been engaged and secured when the latter is mounted on the end of said tube 88. Through said collar 126 and through said tube 88 a complemental hole 130, is tapped in said tube, is provided for a thumb screw 131 that extends through the hole in the collar and screws its threaded end into the tapped hole and fastens said collar 184 of the mire in said recess and to said collar and said tube to thus adapt the tube to means to revolve, as well as carry, said unitary mire around the axis of said tube. However, before said mire is attached to said tube, with the collar 126, the collar 102, the cam 106 and disk 112, the collars 121, 118 and 141 and the disk 132 described assembled thereon, and with the prism-tube 92 equipped with its prisms 96 mounted therein and the arm 91 and rollers 108 and 109 assembled in operative position as described, the said tube with the described complete assemblage is lowered from above and the tube 88, just to the left of said disk 132 placed in the bearing of the support 83 and the collar 126 placed in the bearing of the support 84 of the bracket 77, after which the half-collar caps 87 and 87' are placed in place and fastened by the screws 136. The grasp of said bearings or split-collars on the tube 88 and the collar 126 is just such that the tube 88 will not revolve in its bearings until it is revolved by extra force exerted thereon by the operator. With said tube secured in its bearings as described the screw 139 is extended through the hole 137, see also Fig. 20, of the collar 87 and screwed into the upper tapped hole 134 of the disk 132 and the screw 140 is extended through the hole 138 of the support 83 and screwed into the tapped lower hole 134 of said disk 132, thus securing the disk to the support 83. Said screws 139 and 140 have their heads countersunk in the members carrying them. It is obvious that the disk 132 is stationary and that the tube 88 revolves in the hub of the disk. The collar 141, of the indicator 143, is friction tight on the hub 133 of the disk 132 and the indicator 143 does not move from graduation to graduation on the scale except when manually moved from one graduation to another by the operator.

A heavy collar 144 is provided, see Figs. 38 and 1, it being constructed with a handle 145 that is itself constructed with a recess 144' in which is attached, by a pin 138' a swingable blade 138 that, when swung downward, engages its end in a recess 43, see also Fig. 20, in the support 83 to lock the instrument against accidental revolving during certain operations of the instrument and while changing optical components thereof. Said collar 144 is placed in firm contact with the left surface of the support 83 and fixed to the tube 88 by a screw 147 through it and into a tapped hole in said tube. It is obvious that the handle 145 of said collar 144 is adapted to facilitate revolvable control of the instrument.

An ocular-tube 148 is provided, see Figs. 24 and 1, hereinafter fully described, is equipped with a suitable ocular-system as shown mounted on the left end of said tube 88 with its internally threaded collar 149 engaged on the threaded section of said tube by which the ocular is focused, relative to the objective lens and the distance of the object viewed to suit the refractive state of the operator's eye.

However, before describing said ocular and other parts of the instrument, and in order that the operation of the scales 116 of the disk 112 and their cooperative indicators 119 and 122 and the scale 135 of the disk 132 and its cooperative indicators 120 and 143 be fully understood, may we suppose, for example, that as shown the instrument, and thus also the mire 181, has been revolved into position adaptable for measuring a certain cornea first in its ninetieth degree meridian, that is to say its vertical meridian. The mire 181 is shown in such position in Fig. 1. Also in said Fig. 1 both indicators 120 and 143 are shown as if they were registering at the ninetieth degree meridian on the scale 135 of the disk 132. However, if said indicator 143 should not be aligned back of the indicator 120 the operator would move it by hand to that position before he again revolved the instrument, and, as stated, its collar 141, fitting as it does friction tight on the hub 133 of the disk 132 and free of the collar 118, will prevent it from moving away from said ninetieth degree graduation when the instrument and the indicator 120 is revolved in unison with the mire into a secondary position to measure the cornea in a secondary meridian thereof: the said indicator 120 being adapted to always indicate the meridian of said cornea over which the long diameter of the mire is located. That is to say, the indicator 120 moves around with the mire to register on said scale the meridian of the secondary position of the mire and the meridian in which the secondary measurement of the cornea is to be made, and permits the said indicator 143 to remain at the graduation indicative of and marking the meridian of the primary position of the mire and the meridian of primary measurement of the cornea.

It is to be understood that said mire 181 is adaptable to be revolved throughout all degrees of the circle, and is also adaptable to measure, in any one of its three hundred and sixty meridians. It is also to be understood that the indicators 119 and 122, the indicator 120, the optical system in the iconoscope, the prism-tube and its prisms, and the disk 112 and its attached cam 106 is always revolved in unison with the mire 181 into position to measure in a new meridian of the cornea, but when the mire is over said meridian and ceases to revolve, the indicator 122 is moved, by hand, to position back of the indicator 119, after which the disk 112, to revolve the cam, is revolved on the tube 88 to move the prisms for making the measurement and thus said disk brings that graduation on the scale of the disk, indicative of the result of mensuration into view through the indicator 119, while the indicator 122, it carried with the disk, continues to register the result of mensuration in the former or primary meridian of the cornea. The ocular-tube 148, mentioned in preceding paragraphs, is preferably provided with a four-lenses and two-stops combination for use with the objective lens for viewing images on corneas when the mire is employed. Said ocular-tube is mounted by inserting its right end into the left end of the tube 88 and threading its collar on the threaded-section 149' of said tube; said threads of the tube and the threads in said collar 149 of the ocular-tube being adapted for focusing the ocular relative to the objective lens 150 and the operator's eye.

Of said ocular-system, one pair of lenses and one stop, see Fig. 1, is mounted in a small short tube 123, see Fig. 24, while the other pair of lenses and the other stop is mounted in a second small short tube 124, see same figures, and said short tubes 123 and 124 are mounted in said ocular tube 148, from which they can be readily removed to permit mounting other pairs of like tubes provided, that are equipped with a different ocular-system of lenses, in their place.

The said objective-lens 150, mentioned above, is preferably detachably mounted in a detachable collar 165, see Figs. 23 and 1, that engages friction tight in the right end of the iconoscope-tube 88. Several objective-lenses of varying strength are provided and each one is adaptable to be interchangeably mounted in said collar 165, or if preferable each lens may be mounted in a separate collar adaptable to be interchangeably mounted in said tube 88. Said collar 165 is provided with an annular abutment ring to its inner surface, near its right end, against which the right surface of the objective-lens contacts around its periphery. And, to fasten said lens in said collar 165 against said annular ring, a shorter collar 166 is provided which fits friction tight in said collar 165 and against the left peripheral surface of said objective-lens. Said short collar 166 is provided with a nail-clip 165' in its inner surface to facilitate removal of it to permit interchangeably mounting other objective-lenses, mentioned, in the collar 165. And said collar 165 is also provided with nail-clips 167 in its outer surface to facilitate removing it from the tube 88, to permit removal of the collar 97 for changing the prisms therein or for removing said prisms from the tube when it is found desirable to use the iconoscope of the instrument without its doubling-system. It is of course obvious that the mire 181 must be removed in order to make the changes named in the iconoscope.

Constructing the iconoscope adaptable for interchangeably mounting different combinations of optical components, extends the scope of usefulness of the iconoscope far beyond that of an iconoscope not adaptable for exchanging its optical components.

Before I describe the mire 181, I will describe two different modifications of prism-tube operating mechanism that are adaptable to be used cooperatively with said disk 112; one said modification, see Fig. 37, is very little different from that already described, the difference being that the post 110 is fixedly attached in a hole in the upper surface of the prism-tube 92, the slot 89 in the tube 88 is provided in its upper wall instead of in its lower wall, and the spiral groove 107 is cut from the inner surface of the hollow cylinder completely through the cylinder walls and the said post carrying the rollers 108 and 109 would be engaged outward in said groove instead of inward as shown in Fig. 1. The arm 91 would be discarded and the post 110 would be fastened to the prism-tube 92 near its left end, however, the slot 89 would be closed against admittance of light by the cylinder 106 because the post traveling in said slot would be always within the distance of the length of the said cylinder.

Said second modification provides, in lieu of the cylinder and its spiral-groove, the post 110 and its rollers, and the arm 91, which same would be discarded, an annular collar 168, see Fig. 49, it being considerably larger than the tube 88 to provide an annular recess around said tube between it and the inner surface of said collar, which same would be fixedly attached to the right surface of the disk 112.

Should said second modification be adopted, it may be preferable to form the right end-section of the tube 88 with squared inner walls, and to construct a prism-tube, employed in lieu of the tube 92 with squared outer walls to prevent the prism-tube from turning in the iconoscope-tube; however, if neither one of said tubes are squared, but are made round, they will be constructed, preferably, as shown in Figures 49, 50 and 51, respectively, in which the prism-tube 169 is provided with an elongated key 170' projecting downward from its lower surface, said key being adapted to travel in a keyway 171' cut lengthwise in the floor of the tube 88. In either case, the tube 88 will have, as shown in Figs. 49 and 50, one squared opening 170 in its floor near its right end and a second like opening 171 in the floor near its left end, said opening 171 being just below the collar 168.

A wire 172, preferably, or a strand of other suitable material, having its one end attached, by means of a screw-peg 173, to the right end of the floor of the prism-tube 169, passes around a spool-like roller 174, secured in the wall of said opening 170, from which it extends forward along the under surface of the tube 88 to a point just forward of the opening 171 at which point it passes through a small pulley 175, swiveled in the floor of the tube 88, and from said pulley it passes upward around the left side of the tube 88 to its top and on around said tube to its lower surface again, where its end is attached, by means of a peg 176, to the inner surface of said collar 168. A second wire 177, shorter than the wire 172, having its one end connected, by means of a screw-peg 178, to the left end of the floor of said prism-tube 169, passes forward over the floor of said tube 88 to said opening 171, at which point it passes downward around a small roller 179, journaled in one wall of said opening 171, and after passing around said roller 179 it passes around under another spool-like-roller 180, carried on a journal secured in the walls of said opening 171 below the roller 179, and has this end attached, by means of a peg 181, to the inner surface of said collar 168. Thus, it is seen that the traction end of each wire is attached to the collar 168, revolved by the disk 112, at equal points of its circumference, and, when said disk 112 and said cooperative collar 168 are revolved, on the tube 88, toward the right the wire 177 is pulled around the rollers 180 and 179 and wound circumferentially around the tube 88 to pull the prism-tube 169, with its prisms, toward said disk 112 a distance equal with the length of the circumference of said tube 88 at one revolution of said disk. And, while said wire 177 is pulling said prism-tube toward the disk it is simultaneously pulling the wire 172 around the roller 174, which thus synchronously unwinds said wire 172 from said tube 88 while winding the wire 177 around the tube 88, so that when the disk is revolved in the opposite direction the wire 172 is rewound around said tube 88, and thus pulls the tube 169, with its prisms, toward the objective-lens and away from said disk.

I believe that it is clear that revolving of said disk 112 is adaptable to move the prisms for mensural purposes in the same manner that the disk, cam and rollers combination accomplish their movements, and that the scales of said disk 112 are equally adaptable to cooperation with either modification described as with the said disk, cam and rollers combination.

While but two different modifications adaptable to cooperate with said disk 112 for moving the prisms of the instrument are shown in the drawings and fully described, several other modifications have been found adaptable by the inventor, and therefore, any combination of mechanical parts combined with a disk to revolve and thus move the prisms of the instrument is deemed as included within the scope of the present invention, and many changes are contemplated without departure in the spirit and scope thereof.

The said unitary mire 181 provided, and previously mentioned, is suitably constructed to adapt it to be quickly dismounted from the instrument, either for the purpose of exchanging certain optical components of the iconoscope thereof or for the purpose of employing said iconoscope for viewing purposes, without the mire in operation. In the construction, the mire itself is fixedly attached by means of screws 182, see Fig. 40, to a yoke 183 provided with a long collar 184 that is adapted for attaching the mire onto the right end of said iconoscope-tube 88, said collar fitting snugly within the recess 129 between the collar 126 and said tube, see also Fig. 1, is rigidly, yet detachably, connected to said collar and the tube by a thumb-screw 131 extended through the hole 130 of said collar 126, through the hole 130 in said collar 184 screwed and into the tapped complemental hole in said tube 88. The unitary mire is thus rigidly connected to the iconoscope-tube of the instrument and adapted to be revolved in unison with it around the axis of the iconoscope as a center. The face of the mire carrying the image-reflecting-objects, being cylindrically curved itself, it obviates the necessity of an arc for carrying said objects.

In Fig. 1 the mire is shown in its vertical position, that is in position adaptable for measuring a cornea in its vertical meridian, and in said figure the mire is shown in section. The mire is constructed with a posterior closure 165, to which said yoke 183, curved to conform, is rigidly attached; a floor 186 in which are circular openings, in which the respective sockets for electric light bulbs are mounted, the wires from the respective sockets passing backward from said openings to their respective points of attachment to a switch-board 197, hereinafter described; a roof 187; end-closures 189 and 190, respectively; a cylindrically curved, translucent front closure 188; and a plurality of internal partitions 191 that divide the mire into, preferably, five pairs of chambers. The number of chambers is obviously arbitrary. Said chambers, for simplicity of description and explanation of their operation, are named in pairs as follows, $a$ and $b$ for the central pair, one located to each side of the axis of the iconoscope, the inner walls of which form a tapering funnel, complemental with said collar 184, and thus with the tube of said iconoscope, that has its small end opening in the face, or front closure, of the mire, with its center on the axis of said iconoscope; the second pair of chambers are named $c$ and $d$, the third pair are named $e$ and $f$, the fourth pair are named $g$ and $h$, and the fifth and outermost pair of chambers are named $i$ and $j$.

Said cylindrically curved front closure 188, of the mire, constructed, preferably of glass cut from a hollow glass cylinder of the right size diameter, is curved to that radius that is concentric with the center of curvature of a cornea when it has been located for measurement at the specified distance from the objects on said closure, while at the center of said glass closure there is provided a small circular opening 193 complemental with the opening of the funnel formed by the converging inner walls of said chambers $a$ and $b$; said opening 193 being just large enough to admit a cone of rays from images on said cornea to the objective-lens of the iconoscope. Said floor and roof of the mire are each fastened, by suitable means, such as screws, to the posterior closure 165 and to the respective end closures, the latter also fastened to said posterior closure. Said partitions 191, respectively, are, preferably, fastened in narrow channels cut into said roof and floor. Said cylindrically curved translucent closure, shown as made of glass, can be a strip of cloth stiffened by combination with silicate of sodium or potassium; however, either closure that is to be employed is attached, preferably, to the floor, to the roof and to the front surfaces of the partitions, by a suitable cement, as shown, or, and as is preferable if the glass is used, it may be attached in place by suitable clasps, they being connected along the front edges of the roof, the floor and the end-closures, and engaged over the edges of the glass closure.

Said respective openings, in the floor of the respective chambers of the mire, which admit the electric light bulbs 188' into the chambers, are constructed suitable to permit the socket carrying its bulb to be pushed upward through its opening, to place the bulb within the chamber, and to then be turned slightly to engage a lug provided on the side of each socket, on the floor of the chamber to thus support the socket in place in said opening. However, any suitable means for mounting the respective sockets with their bulbs in the respective chambers may be employed, but said means should permit removal of a respective bulb independently of the other bulbs, and said means should not necessitate removal of the front closure of the mire to exchange said bulbs.

Said wires from the respective sockets are gathered into one bundle, it made sufficiently long to permit revolving the mire a complete revolution, and pass toward the base of the bracket 77 where the said wires leave said bundle and have their respective ends distributed and suitably connected, each one to an independent switch-button; said buttons being arranged on said switch-board 197; and said buttons, respectively, each bearing a character (or mark) indicative of the chamber to which the wire extends. Said switch-board, preferably, is constructed with horizontal slots 198 at its ends, one of which engages around a post 199 having a flat head and fastened in the side of the base member of the bracket 77, while the slot at the opposite end of said member engages on another post attached near the other end of said base member of the bracket, said last named post having an elongated, swiveled head 200 that not only fastens the switch-board securely to the base of the bracket, but also permits of quick mounting or dismounting of it there from at times when it is desired to dismount the mire and its electrical fixtures from the instrument. Leading off from said switch-board is a suitable wire to connect with an electric socket in the room.

On said cylindrically curved front closure of the unitary mire, and preferably on its outer surface, are delineated, preferably, five pairs of objects that, for convenience, we will call by the same names assigned to their respective chambers back of them in the previous paragraphs. Each one of said objects is shaped, preferably, in likeness to a capital letter F, it being formed with a stem, one long stroke, and one short stroke. While the objects are shown as if they were opaque on the translucent face of the mire, in practice it may be found to be preferable to make the objects translucent and the areas surrounding them opaque. In either case, the objects will be located on the mire face substantially like they are shown; that is, object $a$ an inverted F before chamber $a$ and object $b$ a perverted F before the chamber $b$, and, if said chambers $a$ and $b$ are illuminated as a pair to measure in the polar area of a cornea, their images on said cornea will be reflected like those shown in Fig. 41, and the said pair of images will be, to all intents and purposes, encompassing the pole of the cornea, while to the observer, through the iconoscope, after he has moved the prisms and consummated the measurement, they will appear as shown in Fig. 42, wherein the secondary image of object $a$ is shown juxtaposed to the primary image of $b$, the two images forming a parallelogram image, while the primary image of said object $a$ is shown to the right and the secondary image of said object $b$ is shown to the left of said parallelogram image. To continue the description of the objects; the object $c$ is an inverted F before the chamber $c$ and the object $d$ is a perverted F before the chamber $d$, and when these two chambers and objects are illuminated as a pair to add their images to those of objects $a$ and $b$, to build up a compounded image on and to measure the next adjacent area of said cornea, in the same meridian, the images on the cornea are reflected as shown in Fig. 43, while to the observer, through said inconoscope, if said adjacent area of the cornea corresponds in curvature to that of said polar area already measured, the images will appear as those that are shown in Fig. 44, in which, as in the former case, the secondary image of object $a$ is juxtaposed to the primary image of object $b$, while now the secondary image of object $d$ is juxtaposed to the primary image of object $a$ and the secondary image of object $b$ is juxtaposed to the primary image of object $c$, thus producing the appearance, to the observer through the iconoscope, of three parallelogram images and the primary image of object $d$ to the right and the secondary image of object $c$ to the left of said three parallelogram images. To continue, the object $e$ is a perverted F before the chamber $e$ and the object $f$ is an inverted F before the chamber $f$, and when the named chambers and objects are illuminated to add the images of objects $e$ and $f$ to the images of the objects $a$, $b$, $c$ and $d$, to continuously build up said compounded image and to measure in the next adjacent area of said cornea on the same meridian, the images on the cornea are reflected like those shown in Fig. 45, while to the observer, through said iconoscope, if said adjacent area of said cornea corresponds in curvature to that of the areas already measured, the images will appear like those shown in Fig. 46, in which the primary image of object $b$ is juxtaposed to the secondary image of object $a$, the primary image of object $c$ is juxtaposed to the secondary image of object $d$, the primary image of object $d$ is juxtaposed to the secondary image of object $f$, the secondary image of object $b$ is juxtaposed to the primary image of object $c$, the primary image of object $e$ is juxtaposed to the secondary image of object $c$, while the secondary image of object $e$ appears to the left and the primary image of object $f$ appears to the right of five parallelogram images produced. To continue, when all five pairs of chambers and objects are illuminated to successively add their images to those described and to measure out to and including the peripheral area of said cornea, the images reflected on said cornea will be like those shown in Fig. 47, while to the eye of the observer, through the iconoscope, if all areas of the cornea conform to a uniform curvature, they will appear like those shown in Fig. 48, in which, as in the cases described, the prisms have produced a secondary image for each primary image shown in Fig. 47 and moved it over into juxtaposition to its primary image, thus nine parallelogram images, one secondary image, and one primary image are shown in the figure.

While the diagrammatic views of the images show only those images reflected on one meridian of a cornea, and said cornea having uniform curvature in each successive adjacent area, if any area thereof should have had a difference in refractive curvature, when the images that were added for measuring that respective area were observed, they would have shown an overlapping of a primary image by a secondary image, or vice versa, a separation of that pair of images. When it so happens that the images of the central pair of objects are reflected on an astigmatic cornea and on a meridian lying between the two principal meridians of said astigmatic cornea, the central line of the parallelogram image, as viewed through the iconoscope, will appear broken, that is, not continuous, in which case, the mire is to be slowly revolved until said line becomes straight and continuous, which operation locates the axis of one principal meridian of said cornea, as will be readily understood by those versed in the art. In Figures 42, 44, 46 and 48, respectively, the images of the respective objects are shown as doubled just enough to place the extraordinary image of a respective object over to juxtaposition with a respective primary image of the cooperative respective object, while in many cases it will be found desirable, convenient, and in certain very low cases of astigmatism, to illuminate the objects *a* and *i* only as a cooperative pair and to move the prisms suitable to double the extraordinary image of object *a* over to juxtaposition with the ordinary image of object *i*, and to employ said extraordinary image and ordinary image to locate the axis of a primary meridian of a cornea, if astigmatic, or to prove the absence of astigmation. And, as is obvious, respective operators of the instrument may, with the means provided and described, arbitrarily elect to employ object *a* cooperatively with either, object *b*, object *e*, object *g*, or with object *i*; he may elect to employ, objects *d* and *c* cooperatively as a pair, objects *f* and *e* cooperatively as a pair, or, objects *h* and *g* cooperatively as a pair; he may elect to employ objects *a* and *e* cooperatively as a pair to locate the axis of a principal meridian of an astigmatic cornea and, after having located the axis on said meridian, elect to darken said object *e* and to illuminate object *b* and employ it with said object *a* to measure in the polar area of said cornea, and he may then elect to successively illuminate respective other objects, either singly or in pairs, to check up on or to measure successively adjacent areas from said polar area outward to the peripheral area. And again, the operator may, if he so desires, illuminate, electively, one central object close to the axis of the iconoscope and reflect its image on the polar area of the pupillary area of the cornea and then observe said image and also said area for diagnostic purposes.

While many differently shaped objects may be adaptedly employed as objects for reflecting images for measuring curvature of surfaces reflecting their images, those shown in the drawings were selected from among something over one hundred different kinds of objects that were put to the test of adaptation; and therefore, invention resides, particularly, in objects on a mire adapted to means of adding to and building up, by graduated and successively added images, a compounded reflected image, and in a series of objects on a cylindrically curved mire, each object of which is adaptable for electively illuminating for use in selective pairs and groups of pairs. Invention resides also in the described method of measuring a cornea in either one of the following steps, that is, in illuminating electively a central pair of objects and reflecting their images on a cornea, one to the opposite sides of and close to the pole thereof; in illuminating one object electively and reflecting its image on a cornea close to the pole thereof and illuminating a second object electively and reflecting its image on said cornea, on the same meridian, to the opposite side of the pole and distanced outward therefrom; in illuminating, electively, objects singly, in pairs, or in groups of pairs, suitable to and for measuring each and every area of said cornea, and to measure the cornea in any one or all meridians thereof; in illuminating, electively, two cooperative objects and reflecting their respective images on said cornea at different distances from the pole thereof and to the opposite sides of said pole in order to locate a principal meridian of said cornea should it happen to be astigmatic, then darkening said objects and illuminating a central pair of objects and reflecting their images, on said located principal meridian of the cornea, close to and to the opposite sides of said pole and measuring said polar area, and then successively illuminating other objects, or other pairs of objects, and reflecting their images successively on said meridian of the cornea to successively measure each angular area thereof; in illuminating, electively, objects and reflecting their images on the anterior portion of the sclerotic tunic and measuring the curvature thereof for the purpose of estimating the length of the antero-posterior axis of the globe; and in illuminating an object, or a pair of objects, and reflecting an image over the polar area of the pupillary area of a cornea and observing said image in the pupil through an iconoscope equipped with an optical system suitable for close, and microscopic inspection.

Operation of the apparatus although to a certain extent becomes arbitrary with respective operators thereof, is as follows, preferably: The patient is seated with his head in the headframe 21; the craniostat 25 is adjusted to the back of the patient's head to keep his forehead contacted with the foreheadrest 22; the chinrest 19 is vertically adjusted to place the patient's chin at proper elevation for his forehead to be comfortably contacted with said foreheadrest, a measuring device 29 is manipulated to measure and register the prominence of the pole of the patient's cornea, a record of which is made, and to also measure the distance of the plane of the patient's cornea from the plane of his forehead as it is contacted with said foreheadrest, the distance, plus or minus, obtaining being registered by the indicator 34 on the scale 31 of said device 29; the first-carriage 49, with its indicator 59 registering on the scale 58 to indicate the direction and distance, is moved in that direction indicated the distance required to place the plane of the objects on the face of the mire proper, specified distance from the patient's cornea; the second-carriage 62 is moved laterally to align the iconoscope with the patient's cornea; the hand-wheel 43 is manipulated to either raise or lower the mensural organization and synchronously move, vertically, the headframe, and thus the patient's cornea, in the opposite direction, (the movement of his cornea being relatively small compared with the movement of the mensural organization), to align the axis of the iconoscope with the axis of his cornea, vertically; and the iconoscope is then swung, by means of the turntable-like arrangement, to align the axis of the iconoscope with the axis of the patient's cornea, laterally and when this has been done; and adjustments above described have been accomplished the cornea of the eye about to be measured is located at a point that places its center of curvature at the center of curvature of those objects respectively that are about to be used to reflect their images on the cornea to be employed as means for measuring the refractive value of the cornea, and the cornea will remain unchanged from that point throughout the mensuration, which same is accomplished as follows: preferably, first the two objects $a$ and $i$, (but arbitrarily, by election, any two objects, but one to each side of the axis of the iconoscope), are illuminated to reflect their images on the patient's cornea, the image of object $a$ close to and to the left side of the pole of the cornea and the image of object $i$ distanced away from and to the right side of the pole of the cornea; the prisms are now moved, by revolving the disk 112 and the cam 106, until, as viewed by the operator through the iconoscope, the extraordinary image of object $a$ is juxtaposed to the ordinary image of object $i$, at which time, the mire is revolved, the operator continuing to view the images, and if the central line of the parallelogram image, i. e. the axis finding line, breaks, astigmatism of the cornea is denoted, and in that case the mire is again revolved until said lines are straight, or continuous, which same when obtained denotes that the images are being reflected on one of the two principal meridians of the cornea; the axis of said principal meridian when located being indicated by the indicator 120 on the scale 135, of the disk 132; next, preferably, the object $i$ is darkened and the object $b$ illuminated to reflect its image on the cornea, to the right of the pole, to cooperate with the image of object $a$, and the prisms are now moved adaptable to measure the polar area of his cornea in said principal meridian, the result or reading of said mensuration being registered by the indicator 119 on the tripple scale 116, on the disk 112; next, preferably, the objects $c$ and $d$ are illuminated, their images reflected on the annular area next adjacent to the polar area, on the same meridian, to ascertain if the curvature continues uniform with, or is different from that of said polar area; if the curvature is uniform, the extraordinary image of object $b$ will be juxtaposed correctly to the ordinary image of object $c$, the extraordinary image of object $d$ will be juxtaposed to the ordinary image of object $a$, and the central line of the three parallelogram images will be straight, and like those shown in Fig. 44; (however, for clearness, may we suppose that said polar area and said next adjacent area differ in curvature, in which case the two lateral parallelogram images will not appear perfect, that is, they will be, either narrower than the central parallelogram image, in which case greater curvature of the said adjacent area than in the polar area is denoted, or they will appear broken by separation of the stroke lines, in which case lesser curvature of said adjacent area of the cornea than in its polar area is denoted. If it is desired to measure said adjacent area, it will be preferable to darken object $d$, leaving only the parallelogram images to the left of the pole of the cornea, and revolve the disk 112, moving the prisms, to bring the parallelogram image formed by the extraordinary image of object $b$ and the ordinary image of object $c$ to proper juxtaposition, ignoring the central parallelogram image, which obviously will change form, thus measuring said adjacent area, the result of which will be indicated by the indicator 119 on the scale 116, and the difference in curvature of the two areas is denoted by the difference in the two readings on said scale marked by the two indicators 119 and 122; if it is found that said polar and said adjacent areas are equal in curvature, the objects $e$ and $f$ are illuminated which results in a group of images on the cornea like that shown in Fig. 45, and if the curvature in the next adjacent area, on which the additional images are reflected, is equal to that of the areas already measured, to the operator, through the iconoscope, there will appear five parallelogram images, each perfect and equal, as shown in Fig. 46; and continuing to illuminate other objects of the mire to reflect additional images on the cornea to measure successively adjacent areas thereof, when all pairs of objects of the mire are illuminated, the images reflected on the cornea will be like those shown in Fig. 47, and if all areas are equal in curvature to the operator, through said inconoscope, the group of parallelogram images will appear as shown in Fig. 48; having surveyed the successively adjacent annular areas on one meridian, i. e. the primary meridian, of said astigmatic cornea, the indicator 122 is left as it is to continue to register the finding of said meridian on said scale 116, the indicator 143 is now moved into position back of the indicator 120 and left there to continue to register the axis of said meridian on said scale 135; preferably all of the objects are darkened, so as to not dazzle the patient then, the mire is revolved, carrying with it said indicator 120, ninety degrees toward the right, which same will be shown when reached by said indicator 120 on said scale 135, it registering the axis of, and the degree of the secondary principal meridian of said cornea; again, an elected pair of objects of the mire, preferably the objects a and i, are illuminated, their images reflected on said secondary meridian of said cornea, their images viewed while revolving the disk 112 to juxtaposite the extraordinary image of object a to the ordinary image of object i, and if the axis line of the parallelogram image observed is straight, the operator is assured that the axis of the secondary principal meridian of the cornea is at right angles to, or ninety degrees away from the axis of the primary principal meridian, (however, should said axis line not to be straight, he would revolve the mire until they did become straight to locate the axis of said secondary meridian, which is, however, invariably at right angles to the primary meridian); having located the secondary meridian, the procedure described for measuring the primary meridian may be repeated for measuring this meridian, and the result of said mensuration is registered on said scale 116 by the indicator 119, while the axis of this meridian is registered on the scale 135 by the indicator 120; the reading of the two, i. e. the primary and the secondary, meridians are taken from these scales and the record thereof written.

Having finished with one eye, in so far as the cornea is concerned, the second-carriage is manipulated to move the mensural organization of the instrument over into position before the fellow eye, and to measure which the procedure as described may be repeated.

For the purpose of estimating what is the antero-posterior axial length of the globe of the eye, the telescope is swung, by means of the turntable-like device, suitable to reflect images of objects of the mire on the sclerotic tunic, and certain pairs of objects are illuminated to reflect images thereon and the procedure similar to that described is used to measure the curvature of said tunic.

As has been mentioned in preceding pages, operation of different sections of the instrument is arbitrary to the operator; the fact is that operation of the complete instrument is to a great extent arbitrary with respective operators thereof, they to be permitted, as is their right, to develop a technic of their own. However, while, the method of measuring corneas, as described is possible with any instrument constructed with a multiplicity of independently illuminable image-reflecting-objects and the objects adaptable to be located always at the same distance from successively respective corneas and maintained at that established distance, the method described is peculiarly adapted to an instrument constructed substantially like that shown in the drawing and described in these pages.

The dimensions of the instrument is elective to choice, however, the size of the objects on the face of the mire, the cylindrical curve of said mire face, the distance of separation of the objects on said face, (preferably, the width of each object should be the distance of their respective separations), the specified distance between said objects and corneas measured, the power of the doubling system or prisms, the full range of movement of said doubling means, the distance of movement of said doubling means adapted to measure one diopter of error of refraction, and the power of the auxiliary prisms, and as shown, the graduations on the tripple scale on the disk 112, will be established on calculations based upon, either the table given in these pages, a like table, or upon suitable data found in prevailing text books, all of which is readily understood by those versed in the art to which the invention belongs.

To view his patient, while aligning the iconoscope with his eye, the operator may look through the crescent opening 135' in the disk 132 and through that like opening 114' in the disk 112 that happens to be aligned with the opening in said disk 132 at the time, which same enables him to see his patient without looking around said disks.

Having described my invention, what I claim as new, and desire to secure by Letters Patent, is—

1. The herein described method of measuring the cornea of an eye, which comprises locating said eye with its visual axis aligned with the axis of an optical system; manipulating measuring means and measuring the prominence of the cornea of said eye; manipulating other measuring means and locating illuminable objects to be used for reflecting images on the cornea of said eye before said eye at a specified distance therefrom; employing means for and maintaining the eye at the said specified distance from said image-reflecting objects throughout the measurement of said cornea; reflecting an image of one of the said objects on said cornea near its pole and reflecting the image of another one of the said objects on said cornea, on the same meridian thereof, distanced outward from the pole and on the opposite side thereof; and viewing said images through said optical system and doubling them to the observing eye for mensural purposes.

2. The herein described method of measuring the cornea of an eye, which comprises locating said eye with its visual axis aligned with the axis of an optical system used for viewing the eye; measuring the prominence of the cornea of said eye and locating a multiplicity of independently illuminable objects adaptable for reflecting their images on said cornea across one meridian thereof, before it at a specified measured distance; illuminating one of said objects and reflecting its image on said cornea near its pole and illuminating a second one of said objects, widely distanced from said first object, and reflecting its image on the same meridian of said cornea but outward toward the periphery thereof and on the opposite side of the pole from said first image; viewing said images as a cooperative pair through said optical system and doubling them, and revolving said objects around the axis of said eye to locate a principal meridian of its cornea; maintaining said cornea against changing its distance from said objects during revolving movements of said objects; darkening said second object of said pair to eliminate its image from said cornea, illuminating another one of said objects closer to said first object and reflecting its image on the cornea close to its pole, but on the opposite side thereof from said first image; and moving the doubling system of said optical system to measure the curvature of said cornea in that zone or annular area occupied by said images.

3. The herein described method of measuring the curvature of the cornea of an eye, which comprises locating said eye with its visual axis in alignment with the axis of an optical system used for viewing said eye; measuring the prominence of the cornea of said eye; locating a multiplicity of independently illuminable objects, disposed at right angles to said axis of the cornea, at a specified measured distance before said cornea; illuminating as a cooperative pair two of said objects widely separated adaptable to reflect their images on an elected meridian of said cornea with each image on an opposite side of the pole thereof; viewing said images doubled through said optical system and revolving said objects about the axis of said eye to locate the axis of a principal meridian of said cornea; darkening said objects to eliminate their images from the cornea, illuminating the central pair of said objects and reflecting their images on said meridian of the cornea, close to and on opposite sides of the pole thereof; manipulating the doubling system of said optical system and measuring the curvature of the cornea, on said meridian, in the polar area occupied by said images; and successively illuminating other pairs of objects to reflect their images on said cornea to successively add their images to said central pair of images to measure the successively adjacent areas of said cornea on said meridian.

4. The herein described method of measuring the curvature of the cornea of an eye in each of its respective annular areas from the polar area out to and including the peripheral area and on any of its respective meridians, which comprises locating said eye with its visual axis in alignment with the axis of an optical device used for viewing the eye and maintaining said eye against movement by securing the head of the patient in a headframe; measuring the prominence of the cornea of said eye; locating one group of independently illuminable objects, disposed to the right side of the axis of said eye and at right angles to said axis, at a specified distance from said cornea, and locating a second group of independently illuminable objects, disposed to the left of said axis of the eye and at right angles to said axis, at said specified distance from the cornea; illuminating, electively, a certain one of said objects of each group as a cooperative pair and revolving them about the axis of said eye while viewing their images doubled through said viewing device to locate the axis of a principal meridian of said cornea; darkening said objects and electively illuminating respective other objects in cooperative pairs to electively measure each annular area of said cornea on said meridian; and darkening said objects while revolving them ninety degrees to the right into position over the secondary principal meridian of said cornea, and illuminating them electively and measuring the curvature in said meridian.

5. The herein described method of measuring the curvature of the cornea of an eye by employing reflected images as mensural means, which comprises locating independently illuminable objects before said cornea and governing the respective annular areas of said cornea on which images of said objects shall be reflected by electively illuminating certain ones of said objects to reflect their images on said cornea; measuring the prominence of the cornea of said eye relatively to the prominence of the patient's forehead and positioning said cornea proper for directing its axis-line directly foreward; locating a viewing device before said cornea with the axis-line thereof aligned with the axis-line of said cornea; measuring off a predetermined distance from the plane of said cornea and locating said illuminable objects at said distance before the cornea and locating a certain one of said objects very close to the aligned axis-lines and adaptable for reflecting its image on said cornea very close to its pole; and illuminating said object and reflecting its image on said cornea purposely close to its pole and viewing said image magnified through said viewing device for diagnostic and mensural purposes.

6. The herein described method of measuring for and estimating the antero-posterior axial length of the globe of the eye, which comprises locating said eye with its visual axis out of alignment with the axis of the orbit of the eye; aligning an optical system before the eye with its axis aligned with a selected perpendicular to the sclerotic-tunic of said eye; measuring for and locating independently illuminable objects before said sclerotic-tunic at an established mensural distance therefrom, one of which objects is to either side of said axis of the optical system and said selected perpendicular to the sclerotic-tunic; illuminating said objects to reflect their images on said tunic; viewing said images doubled through said viewing device and manipulating the doubling elements of said viewing device to measure the curvature of said sclerotic-tunic in the area of said selected perpendicular to it.

7. An apparatus of the character described, embodying an eye-locating device and an eye-measuring device, comprising a base having an eccentrically fulcrumed lever, said lever supporting on its one end said eye-locating device and supporting on its opposite end said eye-measuring device, and means for manually operating said eccentrically fulcrumed lever for causing change of elevation of each named device synchronously: causing a maximum change in elevation of one named device while causing a minimum change in elevation of the other named device.

8. An apparatus of the character described, embodying an eye-locating device and an eye-measuring device, comprising a base having one vertically movable support carrying said eye-locating device and a second vertically movable support carrying said eye-measuring device, an eccentrically fulcrumed lever carried by said base and carrying on its one end said support of said eye-locating device and carrying on its opposite end said support of said eye-measuring device, and suitable measuring means provided on said eye-locating device to measure the extent of prominence of the cornea of an eye being located by said eye-locating device.

9. An apparatus of the character described, embodying an eye-locating device and an eye-measuring device, comprising a base having one guide-sleeve carrying a vertically movable support provided carrying said eye-locating device and a larger guide-sleeve carrying a second and larger vertically movable support provided carrying said eye-measuring device, a lever having its one end connected to said support carrying said eye-locating device and having its opposite end connected to said support carrying said eye-examining device and being fulcrumed eccentrically of its ends to said base, suitable means to cooperate with the named supports and with said lever and adapted to be manually operated to operate said lever: said lever when operated being adapted to cause a maximum adjusting movement of said eye-measuring device while synchronously causing a minimum adjusting movement of said eye-locating device, measuring means provided on said eye-locating device for measuring the prominence of the cornea of an eye being located by said eye-locating device and for showing the location of the anterior plane of the said eye, and other measuring means provided on said eye-measuring device adapted to be used cooperatively with said measuring means on said eye-locating device for adjusting one said device into a proper working distance from the other said device.

10. An apparatus of the character described, embodying an eye-locating device and an eye-measuring device, comprising a base for carrying the named devices having constructed thereto suitable means to produce a minimum vertical movement of said eye-locating device in one direction while producing synchronously a maximum vertical movement of said eye-measuring device in the opposite direction for quickly aligning the axis of an optical system provided as a part of said eye-measuring device with the axis of an eye being located by said eye-locating device, suitable measuring means for measuring the prominence of the cornea of an eye and for locating the plane thereof provided on said eye-locating device, other measuring means carried on said eye-measuring device adapted to cooperate with said measuring means on the eye-locating device to indicate the proper working distance of separation of the two named devices, and an iconoscope carrying said provided optical system having focusing means adapted to cooperate with said measuring means on the eye-locating device and said measuring means on said eye-measuring device in adapting said iconoscope to the viewing-eye of the operator for viewing at said proper working distance of the apparatus.

11. An apparatus of the character described comprising an eye-locating device, cornea-prominence measuring means carried on said eye-locating device, an eye-measuring device, embodying an iconoscope having suitable image-doubling components therein, comprising a unitary compartmented-mire mounted on said iconoscope with its center on the axis thereof and located before said eye-locating device, and a manually operated member carried by said eye-measuring device adapted to be revolved during mensural operation of said eye-measuring device and having thereon a scale for registering the findings resulting from mensuration: said scale being formed with graduated un-equally spaced registration marks having designative characters therewith.

12. An apparatus of the character described, embodying a suitable mire and an iconoscope having a movable image-doubling component therein, comprising suitable traction means connected to said movable image-doubling component within said iconoscope, a member mounted revolvably on said iconoscope and connected to said traction means and adapted to be manually revolved on said iconoscope to operatively and mensurally move said image-doubling component within said iconoscope, and a registering scale constructed on the face surface of said member: said scale having its registering-marks gradually un-equally spaced from each other.

13. An apparatus of the character described, embodying an iconoscope having a suitable image-doubling component therein, comprising an eye-locating device provided with means suitable for indicating the location of the anterior plane of the cornea of an eye being located by said eye-locating device, a unitary mire attached rigidly to and carried by said iconoscope, said mire having independently illuminable image-reflecting objects, said image-reflecting objects having switch means connecting with their illuminating means suitable for and adapted for use in rendering either of the said objects, respectively, alternately luminously functioning and non-luminous and non-functioning, said unitary mire being adapted to be revolved in unison with said iconoscope about the axis thereof to place said image-reflecting objects over respective diameters of the cornea of an eye being located by said eye-locating device, and a manually operable member mounted revolvably encompassing said iconoscope and being adapted to be manually revolved independently of revolving of said iconoscope and adapted to be revolved also in unison with said iconoscope: said manually operable member having traction members connected thereto and connected to said image-doubling component within the iconoscope and the member being thusly adapted through manually operation thereof to mensurally move said image-doubling component.

14. An apparatus of the character described, embodying an eye-locating device, a mire for reflecting images on an eye being located by said eye-locating device and an iconoscope for viewing said images having an image-doubling device therein, comprising a cylinder-cam mounted revolvably encompassing said iconoscope, a disk-like member connected to said cylinder-cam adapted to be manually operated to revolve said cylinder-cam, a traction member engaging with said cylinder-cam and connected to said image-doubling device within the iconoscope, said disk and cylinder-cam being, when revolved, cooperatively adapted to move said image-doubling device for mensural purposes, a triple scale carried on said disk-like member for registering mensural results, an overhanging double indicator and a cooperative single indicator carried by said disk-like member and cylinder-cam and adapted to register on said triple scale, and an image-reflecting system of independently functioning image-reflecting objects constructed to the said mire.

15. An apparatus of the character described, embodying an eye-locating device and an iconoscope, comprising a combined turntable and adjusting carriage for carrying said iconoscope, a chambered mire having a unitary translucent face closure, a series of independently functioning image-reflecting objects carried on said translucent face closure of said mire, manually controlable illuminating means connected to said mire suitable for and adapted to permit the operator of said apparatus to electively render any respective image-reflecting objects of said series non-luminous and non-functioning and alternately luminous and functioning, a base for carrying said apparatus having an eccentrically fulcrumed equalizing lever having its longer-section end connected to said combined turntable and adjusting carriage and its shorter-sectioned end connected to said eye-locating device, and a manually operated lever-controlling means connected with said lever for operating the lever for making vertical aligning adjustment of said iconoscope with an eye being located by said eye-locating device.

16. An apparatus of the character described, embodying an iconoscope having a movable image-doubling component therein and an eye-locating device for locating an eye before said iconoscope, comprising sighting means mounted on said eye-locating device adapted for use to ascertain the location of the anterior plane of an eye being located by said eye-locating device, a unitary mire device for reflecting images on said eye comprising a suitable chamber having a translucent face closure, a plurality of independently illuminable image-reflecting objects suitably arranged on said translucent face closure of the mire, said mire being rigidly but detachably secured on said iconoscope with its center on the axis of the iconoscope and certain ones of the said image-reflecting objects being located closely adjacent to said axis of the iconoscope and other ones of said image-reflecting objects being located at a spaced distance away from said axis of the iconoscope and the said objects, respectively, suitably disposed on the said face closure relatively to the axis of the iconoscope, a combined disk and cam mounted revolvable on said iconoscope and connected by means of a traction member to said movable image-doubling component within the iconoscope, said combined disk and cam being adapted to be manually revolved on the iconoscope and adapted through their operation to move said image-doubling component for measuring said eye being located by said eye-locating device, and a tripple scale constructed on the face surface of said disk: said scale having one set of graduation-marks spaced unequally from each other.

17. An apparatus of the character described comprising a base having two cylinder guide-sleeves of different size, two supports mounted vertically movable through said two cylinder guide-sleeves and, respectively, connected at their lower ends to the opposite ends of a carrying and operating lever being eccentrically fulcrumed to said base, a horizontally disposed arm carried by the one said support and carrying at its distal end an eye-locating device provided, said eye-locating device comprising cornea-prominence measuring devices and in combination a foreheadrest adapted to cooperate with said cornea-measuring devices, a resilient craniostat having a pad for the head, and a chinrest, a combined turntable, first-carriage and second-carriage device being carried on the other one of said two supports, an iconoscope having a plurality of optical systems and image-doubling systems adapted to be interchangeably mounted therein and carried by said combined turntable, first-carriage and second-carriage device, a unitary mire having a multiplicity of image-reflecting objects mounted on the end of said iconoscope, illuminating means constructed to said unitary mire suitable for and adapted for illuminating either one of the said image-reflecting objects independently of illuminating the other image-reflecting objects and said illuminating means adapted to be used to electively illuminate any two of the said image-reflecting objects as a pair for mensural use and to illuminate an elected number of said image-reflecting objects as a group for similar use, a revolvable cam-device mounted on said iconoscope and connected to a respective one of the said image-doubling systems carried in said iconoscope and adapted for use in mensurally moving said image-doubling system, a registering scale carried by said revolvable cam-device constructed substantially as and for the purposes described.

18. An apparatus of the character described comprising an iconoscope tube constructedly adapted for having different optical systems and different image-doubling systems mounted therein, a plurality of optical systems and a like plurality of image-doubling systems adapted to be interchangeably mounted in said iconoscope tube, a movable member carrying a respective image-doubling system within said iconoscope and connected by a traction member to a revolvable cam-device carried on said iconoscope tube, said revolvable cam-device adapted for mensurally moving said image-doubling system, a base having two vertical guide-sleeves carrying each a vertically movable support, a combined double carriage and turntable device carrying said iconoscope and mounted on one said vertically movable support, an eye-locating device carried on one end of a horizontal member being carried by the other said vertically movable support, cornea-sighting means and cooperative registering means carried on said eye-locating device and adapted for use to ascertain the location of the anterior plane of an eye being located by said eye-locating device, a hand-wheel-operated lever eccentrically fulcrumed to said base and connected at its opposite ends to the said vertically movable supports respectively and adapted for use to vertically adjust the axis of said iconoscope-tube with the axis of an eye being located by said eye-locating device, a disk made to said cam-device carried on said iconoscope and constructedly adapted for mensurally moving the respective image-doubling systems in said iconoscope tube, a scale constructed substantially as described carried by said disk-and-cam device, and cooperative overhanging double indicators and single indicators carried by said disk-and-cam device and adapted to register on said scale the results of mensuration.

19. An apparatus of the character described comprising an eye-locating device having suitable means thereon for locating the anterior plane of an eye being located by said device and for measuring the prominence of the cornea of said eye, and eye-measuring device having suitable adjusting means and cooperative measuring means to permit the operator of the apparatus to measure for and to adjustably locate said eye-measuring device at the established working distance away from an eye being located by said eye-locating device, an iconoscope forming a part of said eye-measuring device having adjustable focusing means suitable to permit said operator to focus the iconoscope suitable for his refractive state and for viewing images reflected on the cornea of an eye being located by said eye-locating device at said established working distance away from said eye-measuring device, a unitary mire carried by said iconoscope having image-reflecting objects thereto suitably disposed about the axis of said iconoscope for reflecting images on the cornea of an eye being located by said eye-locating device, and an illuminating system constructed to said image-reflecting objects suitable to permit said operator to electively illuminate either respective image-reflecting object independently of illuminating other image-reflecting objects.

20. An apparatus of the character described, embodying an eye-locating device and an eye-measuring device, comprising a carriage-and-turntable device carrying said eye-measuring device, a measuring device carried by said carriage-and-turntable device adapted for use to adjust said eye-measuring device at a proper established measuring distance away from an eye being located by said eye-locating device, other measuring means carried on said eye-locating device adapted to be used to measure the prominence of the cornea of said eye being located by said eye-locating device and adapted also to indicate the location of the plane of said cornea to thus cooperate with said measuring device carried on said eye-measuring device in locating the last named device at said established measuring distance, and an iconoscope forming a part of said eye-measuring device having an optical system suitable for and adapted to be focused correctly for viewing said eye being located by said eye-locating device at said established measuring distance by means of focusing the ocular of said optical system relatively to the operator's eye suitable for viewing with a clear definition at said established measuring distance.

BENJAMIN E. BRIERTON.